(12) United States Patent
Thompson

(10) Patent No.: US 12,461,310 B1
(45) Date of Patent: Nov. 4, 2025

(54) MULTI-MODE MULTI-PASS DELAY

(71) Applicant: PsiQuantum Corp., Palo Alto, CA (US)

(72) Inventor: Mark Thompson, Palo Alto, CA (US)

(73) Assignee: PsiQuantum Corp., Palo Alto, CA (US)

( * ) Notice: Subject to any disclaimer, the term of this patent is extended or adjusted under 35 U.S.C. 154(b) by 0 days.

(21) Appl. No.: 18/138,676

(22) Filed: Apr. 24, 2023

Related U.S. Application Data

(63) Continuation of application No. 16/741,646, filed on Jan. 13, 2020, now Pat. No. 11,635,570.

(60) Provisional application No. 62/930,444, filed on Nov. 4, 2019, provisional application No. 62/803,113, filed on Feb. 8, 2019.

(51) Int. Cl.
*G02B 6/14* (2006.01)
*G02B 6/122* (2006.01)
*G02B 6/125* (2006.01)

(52) U.S. Cl.
CPC ............ *G02B 6/14* (2013.01); *G02B 6/1228* (2013.01); *G02B 6/125* (2013.01); *G02F 2201/20* (2013.01); *G02F 2201/205* (2013.01)

(58) Field of Classification Search
CPC ........ G02B 6/14; G02B 6/125; G02B 6/1228; G02B 2006/12147; G02F 2201/20; G02F 2201/205
USPC .................................. 385/14, 28, 30, 39, 42
See application file for complete search history.

(56) References Cited

U.S. PATENT DOCUMENTS

| | | |
|---|---|---|
| 5,159,699 A | 10/1992 | de Monts |
| 6,122,416 A | 9/2000 | Ooba et al. |
| 6,385,376 B1 | 5/2002 | Bowers et al. |

(Continued)

FOREIGN PATENT DOCUMENTS

| | | |
|---|---|---|
| EP | 0532014 B1 | 1/1998 |
| JP | H04264429 A | 9/1992 |

(Continued)

OTHER PUBLICATIONS

"Resonance-free light recycling in waveguides" by Chang et al., Conference of Laser and Electro-optics (CLEO), paper SF1J.5 (Year: 2017).*

(Continued)

*Primary Examiner* — Robert Tavlykaev
(74) *Attorney, Agent, or Firm* — Morgan, Lewis & Bockius LLP

(57) ABSTRACT

An optical device includes a first plurality of waveguides including a first waveguide and a second waveguide and a multimode waveguide delay comprising a first end and a second end. The first waveguide and the second waveguide are coupled to the first end of the multimode waveguide delay. The first waveguide is coupled to a first optical mode in the multimode waveguide delay. The second waveguide is coupled to a second optical mode in the multimode waveguide delay. The optical device includes a second plurality of waveguides including a third waveguide and a fourth waveguide. The third waveguide and the fourth waveguide are coupled to the second end of the multimode waveguide delay. The third waveguide is coupled to the first optical mode in the multimode waveguide delay. The fourth waveguide is coupled to the second optical mode in the multimode waveguide delay.

18 Claims, 18 Drawing Sheets

(56) References Cited

U.S. PATENT DOCUMENTS

| | | | |
|---|---|---|---|
| 6,563,966 B1* | 5/2003 | Tang | G02B 6/122 |
| | | | 385/32 |
| 6,724,968 B2 | 4/2004 | Lackritz et al. | |
| 7,095,920 B1 | 8/2006 | Little | |
| 7,289,698 B2 | 10/2007 | Deliwala | |
| 8,189,972 B2 | 5/2012 | Little | |
| 11,506,919 B2 | 11/2022 | Cherchi et al. | |
| 11,714,329 B1 | 8/2023 | Thompson | |
| 11,789,205 B1 | 10/2023 | Thompson | |
| 2008/0044126 A1 | 2/2008 | Costa et al. | |
| 2012/0219026 A1 | 8/2012 | Saracco et al. | |
| 2012/0321245 A1* | 12/2012 | Vahala | G02B 6/136 |
| | | | 438/31 |
| 2012/0330625 A1 | 12/2012 | Bagheri et al. | |
| 2015/0188659 A1 | 7/2015 | Lipson et al. | |

FOREIGN PATENT DOCUMENTS

| | | |
|---|---|---|
| JP | 05307124 A | 11/1993 |
| JP | 05333221 A | 12/1993 |
| JP | 2000321454 A | 11/2000 |
| JP | 3654383 B2 | 6/2005 |
| JP | 4114791 B2 | 7/2008 |
| JP | 4237102 B2 | 3/2009 |
| WO | WO2019005826 A1 | 1/2019 |
| WO | WO2019038477 A1 | 2/2019 |

OTHER PUBLICATIONS

Li, Ultralow-Loss, High Density SOI Optical Waveguide Routing for Macrochip Interconnects, May 11, 2012, 5 pgs.

Bamiedakis, Cost Effective Polymer Multimode Directional Couplers for High-Speed on Board Optical Interconnects, Jun. 11-13, 2008, 4 pgs.

Lagali, University of Alberta, The Generalized Mach-Zehnder Interferometer Using Multimode Interference Couplers for Optical Communications Networks, 2000, 155 pgs.

Gundavarapu, Integrated Sagnac Optical Gyroscope Sensor Using Ultra-Low Loss High Aspect Ratio Silicon Nitride Waveguide Coil, 2017, 4 pgs.

Lee, Ultra-Low-Loss Optical Delay Line on a Silicon Chip, May 29, 2012, 7 pgs.

Tran, Ultra-Low-Loss Silicon Waveguides for Heteroeneously Integrated Silicon/III-V Photonics, Jul. 13, 2018, 13 pgs.

Sacher, Monolithically Integrated Multilayer Silicon Nitride-on Silicon Waveguide Platforms for 3-D Photonic Circuits and Devices, Proceedings of the IEEE, vol. 106, No. 12, Dec. 2018, 14 pgs.

Mohanty, Nature Communications, Quantum Interference Between Transcerse Spatial Waveguide Modes, Jan. 20, 2017, 7 pgs.

Yang, Silicon Nitride Three-Mode Division Multiplexing and Wavelength-Division Multiplexing Using Asymetrical Directional Couplers and Microring Resonators, Sep. 8, 2014, 12 pgs.

Fu, Efficient Adiabatic Silicon-on Insulator Waveguide Taper, vol. 2, No. 3, Jun. 2014, 4 pgs.

Thompson, Non-Final Office Action, U.S. Appl. No. 16/741,646, Jan. 27, 2021, 17 pgs.

Thompson, Final Office Action, U.S. Appl. No. 16/741,646, Oct. 22, 2021, 20 pgs.

Thompson, Notice of Allowance, U.S. Appl. No. 16/741,646, Dec. 15, 2022, 11 pgs.

Thompson, Non-Final Office Action, U.S. Appl. No. 16/741,646, May 27, 2022, 33 pgs.

Luo et al., "WDM-Compatible Mode Division Multiplexing on a Silicon Chip", Nature Communications, 5:3069, pp. 1-7, (Year:2014), 7 pgs.

Wang et al., "On-Chip Silicon 8-Channel Hybrid (de)Multiplexer Enabling Simultaneous Mode-and Polarization-Division-Multiplexing", Laser Photonics Rev. 8, No. 2, L18-L-22, (Year:2014), 5 pgs.

Bonneau, Non-Final Office Action, U.S. Appl. No. 16/875,372, Aug. 23, 2021, 11 pgs.

Bonneau, Notice of Allowance, U.S. Appl. No. 16/875,372, Mar. 22, 2022, 9 pgs.

Thompson, Non-Final Office Action, U.S. Appl. No. 16/693,163, Feb. 18, 2021, 18 pgs.

Thompson, Notice of Allowance, U.S. Appl. No. 16/693,163, Nov. 3, 2021, 12 pgs.

Teknologian Tutkimuskeskus Vtt Oy, PCT/FI2018/050595, International Search Report and Written Opinion, Nov. 28, 2018, 15 pgs.

Thompson, Notice of Allowance, U.S. Appl. No. 17/843,802, Apr. 4, 2023, 9 pgs.

Thompson, Notice of Allowance, U.S. Appl. No. 17/694,475, Mar. 16, 2023, 9 pgs.

* cited by examiner

MULTI-MODE MULTI-PASS DELAY

RELATED APPLICATIONS

This application is a continuation of U.S. patent application Ser. No. 16/741,646, filed Jan. 13, 2020, which claims priority to U.S. Provisional Application No. 62/930,444, filed Nov. 4, 2019, and U.S. Provisional Application No. 62/803,113, filed Feb. 8, 2019, each of which is hereby incorporated by reference in its entirety.

TECHNICAL FIELD

This relates generally to photonic devices and, more specifically, to optical delay devices.

BACKGROUND

Optical waveguides (also called herein waveguides) are widely used for transmitting light. For example, optical fibers are used in various telecommunication systems. Slab or planar waveguides are used in photonic devices for manipulating light (such as directing light, coupling light, filtering light, generating light output, etc.).

Optical delay devices are used in various optical applications, such as time-resolved spectroscopy, interferometry, and time divisional optical communications. Conventional optical delay devices include long optical waveguides, which increase the overall size of the optical delay devices. Accordingly, there is a need for an optical delay device having a compact size.

SUMMARY

One or more embodiments of the present disclosure provide an optical delay device that includes a multi-mode waveguide for propagating first light through at least a first portion of the multi-mode waveguide. The multi-mode waveguide has a first width. The optical delay device also includes a first waveguide having a second width that is less than the first width and a first coupler connected to the multi-mode waveguide and the first waveguide for coupling the first light from the multi-mode waveguide to the first waveguide. The first waveguide includes a first portion connected to the first coupler for receiving the first light from the first coupler; and a second portion connected to the first portion of the first waveguide for receiving the first light from the first portion of the first waveguide and positioned adjacent to the multi-mode waveguide for coupling of the first light to the multi-mode waveguide as second light so that the second light propagates through at least the first portion of the multi-mode waveguide.

In some embodiments, the first light propagates through at least the first portion of the multi-mode waveguide in a first mode; and the second light propagates through at least the first portion of the multi-mode waveguide in a second mode that is different from the first mode.

In some embodiments, the first waveguide also includes a curved portion connecting the first portion of the first waveguide and the second portion of the first waveguide so that the first light propagates in a first direction in the first portion of the first waveguide and the first light propagates in a second direction different from the first direction in the second portion of the first waveguide.

In some embodiments, the optical delay device includes a second waveguide having a first portion positioned adjacent to the multi-mode waveguide for coupling of the second light from the multi-mode waveguide to the first portion of the second waveguide as third light.

In some embodiments, the second waveguide also includes a second portion connected to the first portion of the second waveguide for receiving the third light from the first portion of the second waveguide and positioned adjacent to the multi-mode for coupling of the third light to the multi-mode waveguide as fourth light so that the fourth light propagates through at least the first portion of the multi-mode waveguide.

In some embodiments, the optical delay device includes a third waveguide having a first portion positioned adjacent to the multi-mode waveguide for coupling of the fourth light from the multi-mode waveguide to the first portion of the third waveguide as fifth light.

In some embodiments, the third waveguide also includes a second portion connected to the first portion of the third waveguide for receiving the fifth light from the first portion of the third waveguide and positioned adjacent to the multi-mode waveguide for coupling of the fifth light to the multi-mode waveguide as sixth light so that the sixth light propagates through at least the first portion of the multi-mode waveguide.

In some embodiments, the optical delay device includes a fourth waveguide having a first portion positioned adjacent to the multi-mode waveguide for coupling of the sixth light from the multi-mode waveguide to the first portion of the fourth waveguide as seventh light.

In some embodiments, the fourth waveguide also includes a second portion connected to the first portion of the fourth waveguide for receiving the seventh light from the first portion of the fourth waveguide and configured as an output port.

In some embodiments, the second waveguide has a third width, the third waveguide has a fourth width, the fourth waveguide has a fifth width, and the first width is greater than the third width, the fourth width, and the fifth width.

In some embodiments, the optical delay device includes an input single-mode waveguide; and a second coupler connected to the input single-mode waveguide and the multi-mode waveguide for coupling input light from the input single-mode waveguide to the multi-mode waveguide as the first light.

In some embodiments, the first portion of the multi-mode waveguide includes a coupling multi-mode portion positioned adjacent to the second portion of the first waveguide for coupling of the first light from the second portion of the first waveguide, the coupling multi-mode portion having a sixth width that is less than the first width; and a non-coupling multi-mode portion having the first width, the non-coupling multi-mode portion being connected to the coupling multi-mode portion through a tapered portion.

In some embodiments, the multi-mode waveguide and the first waveguide are formed in a same layer of material on a substrate.

In some embodiments, the multi-mode waveguide is formed in a first layer of material on a substrate; the first waveguide is formed in a second layer of material, different from the first layer of material, on the substrate; and the first layer of material and the second layer of material are separated by a third layer of material.

In accordance with some embodiments, a method includes propagating first light through at least a first portion of a multi-mode waveguide; coupling the first light from the multi-mode waveguide to a first portion of a first waveguide so that the first light propagates from the first portion of the first waveguide to a second portion of the first waveguide;

and coupling the first light from the second portion of the first waveguide to the multi-mode waveguide as second light so that the second light propagates through at least the first portion of the multi-mode waveguide.

In some embodiments, the method includes coupling the second light from the multi-mode waveguide to a first portion of a second waveguide as third light so that the third light propagates from the first portion of the second waveguide to a second portion of the second waveguide and coupling the third light from the second portion of the second waveguide to the multi-mode waveguide as fourth light so that the fourth light propagates through at least the first portion of the multi-mode waveguide.

In some embodiments, the method also includes, subsequent to coupling the third light from the second portion of the second waveguide to the multi-mode waveguide as the fourth light, coupling the fourth light from the multi-mode waveguide to a first portion of a third waveguide as fifth light so that the fifth light propagates from the first portion of the third waveguide to a second portion of the third waveguide and coupling the fifth light from the second portion of the third waveguide to the multi-mode waveguide as sixth light so that the sixth light propagates through at least the first portion of the multi-mode waveguide.

In some embodiments, the method further includes, subsequent to coupling the fifth light from the second portion of the third waveguide to the multi-mode waveguide as the sixth light, coupling the sixth light from the multi-mode waveguide to a first portion of a fourth waveguide as seventh light so that the seventh light propagates from the first portion of the fourth waveguide to a second portion of the fourth waveguide.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Like reference numerals refer to corresponding parts throughout the several views of the drawings. The drawings may not be drawn to scale unless stated otherwise.

DETAILED DESCRIPTION

Figure 1A:
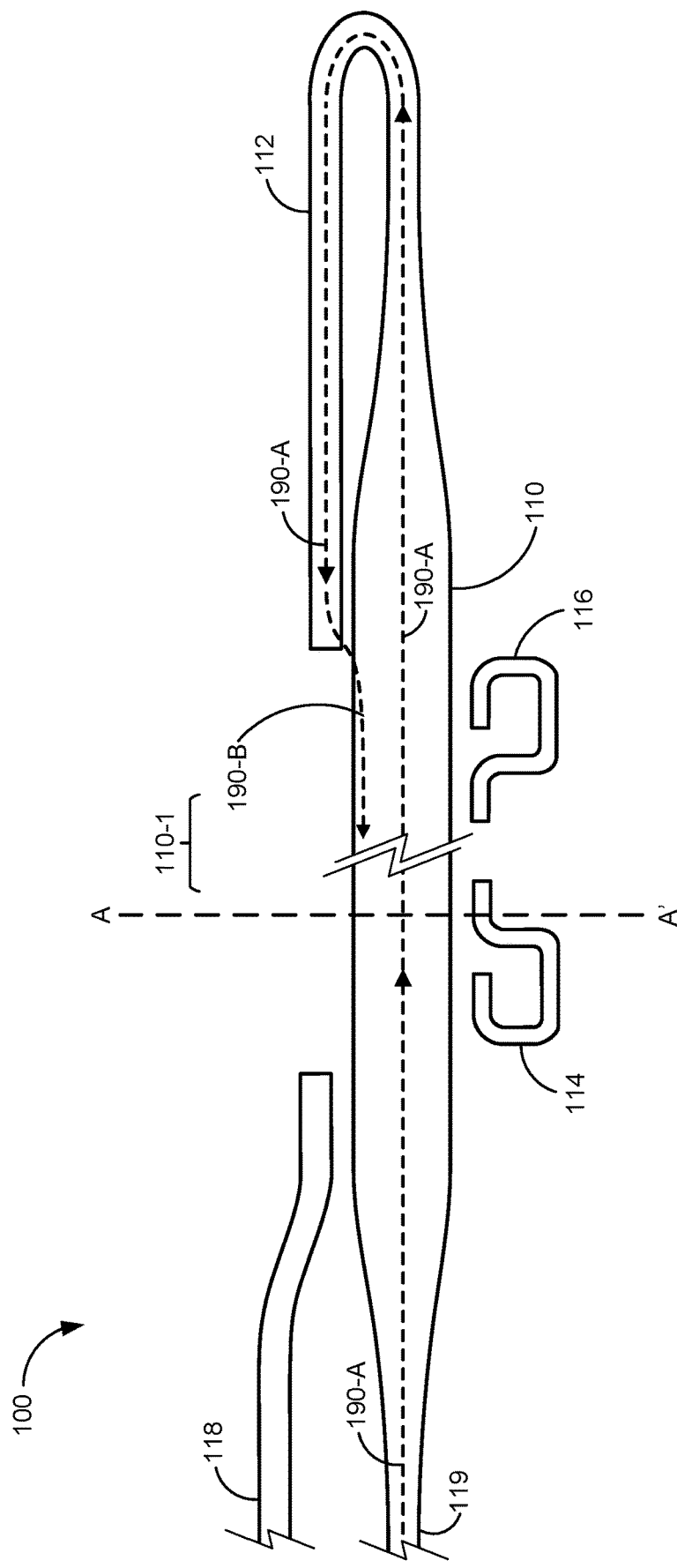
FIGS. 1A-1D are partial plan views of an optical delay device illustrating an optical path of light propagating within the optical delay device in accordance with some embodiments.

As explained above, there is a need for a photonic optical delay device that is compact. Such deficiencies and other related problems are reduced or eliminated by the optical delay devices and methods described herein. The disclosed optical delay devices and methods described herein allow multipath transmission of light within the same multi-mode delay line, thereby eliminating the need for a large area for a long optical path and enabling compact, photonic optical delay devices. In addition, the use of the multi-mode delay line allows light to propagate within the optical waveguide in a different mode for a respective pass, which can be used to control the propagation of the light within the optical waveguide (e.g., using mode division multiplexing techniques). The use of the multi-mode delay line also reduces the optical loss associated with interaction between light propagating within the optical waveguide and the side walls of the optical waveguide, which, in turn, reduces the loss of the transmitted light. Furthermore, the optical delay devices may be configured as variable optical delay devices using one or more switches.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first waveguide could be termed a second waveguide, and, similarly, a second waveguide could be termed a first waveguide, without departing from the scope of the various described embodiments. The first waveguide and the second waveguide are both waveguides, but they are not the same waveguide. In another example, a first order optical mode could be termed a second order optical mode, and, similarly, a second order optical mode could be termed a first order optical mode, without departing from the scope of the various described embodiments. The first order optical mode and the second order optical mode are both optical modes, but they are not the same optical mode. For example, the first order optical mode may refer to $TE_1$ and the second order optical mode may refer to $TE_0$, or the first order optical mode may refer to $TE_2$ and the second order optical mode may refer to $TE_1$.

As used herein, the term adiabatic refers to an optical element (e.g., a coupler or a bend) that has the property that as the fundamental mode propagates through the optical element, the excitation of higher order modes, radiative modes, back reflection modes, etc. are reduced or suppressed, thereby reducing optical loss.

FIGS. 1A-1D illustrate an optical path of light in an optical delay device 100 in accordance with some embodiments. The optical delay device 100 includes a multi-mode waveguide 110 and a plurality of waveguides (e.g., a first waveguide 112, a second waveguide 114, a third waveguide 116, a fourth waveguide 118, and a fifth waveguide 119), which are also called herein side waveguides. In some embodiments, the plurality of waveguides includes one or more single-mode waveguides configured to allow propagation of light in a fundamental optical mode (e.g., $TE_0$). For example, the one or more single-mode waveguides can have a width of 1 micron or less for the case of 1-2 micron light, but one of ordinary skill will appreciate that the single-mode width can vary depending on design wavelength. Typically, propagation of light in higher order modes (e.g., optical modes such as $TE_1$, $TE_2$, etc., or any other optical mode that is not the fundamental optical mode) is prohibited in single-mode waveguides. In contrast, a multi-mode waveguide is configured to allow light to propagate, within the multi-mode waveguide, in one or more of a plurality of modes including the fundamental optical mode and the higher order modes. In some embodiments, the multi-mode waveguide has a width greater than 1 micron thereby allowing for the propagation of more than just the fundamental mode. In general, for propagation of light having a particular wavelength, a single-mode waveguide has a smaller width compared to a multi-mode waveguide. In some embodiments, the plurality of waveguides includes one or more multi-mode waveguides.

Figure 1B:
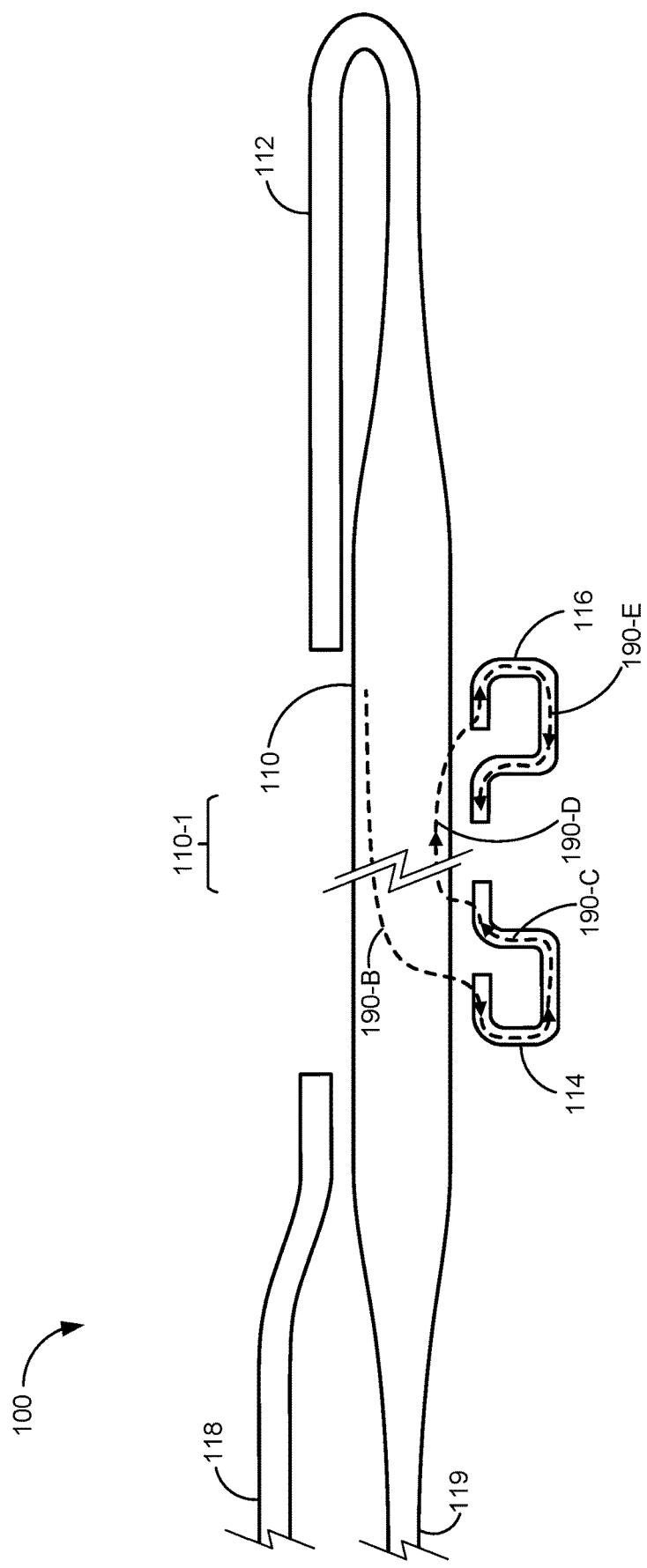
Figure 1C:
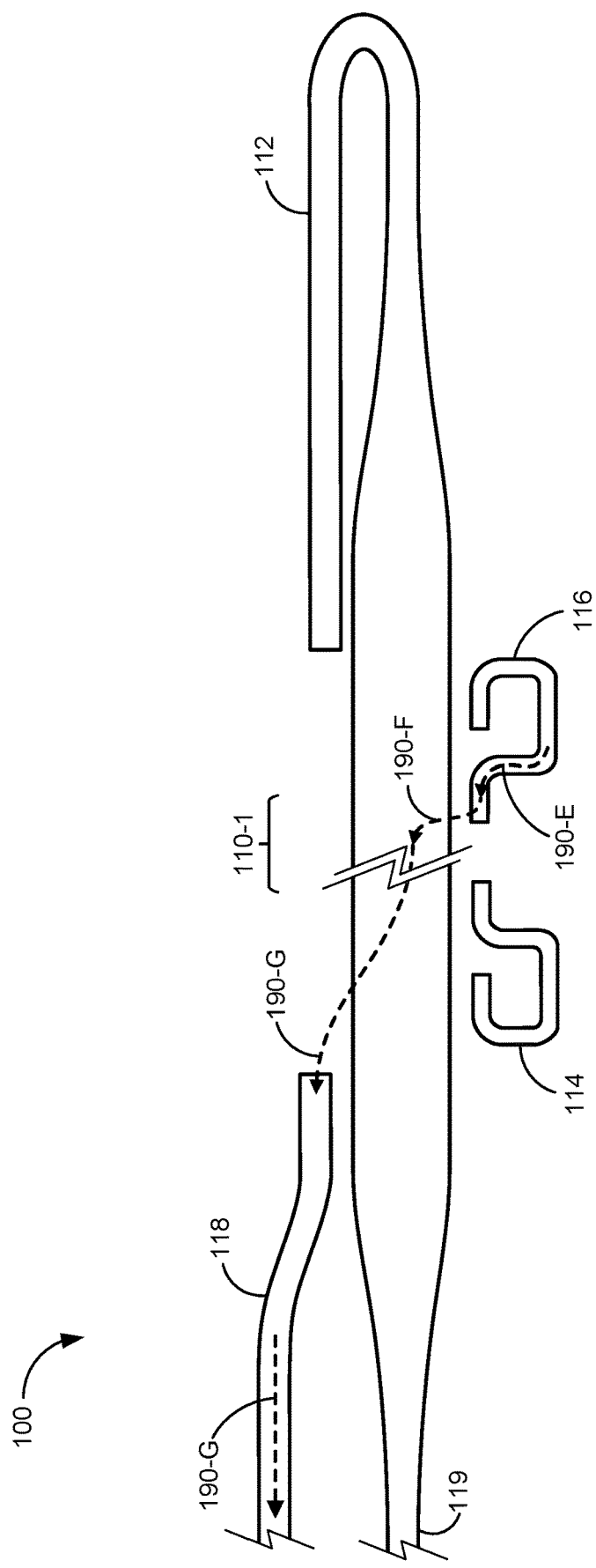
Figure 1D:
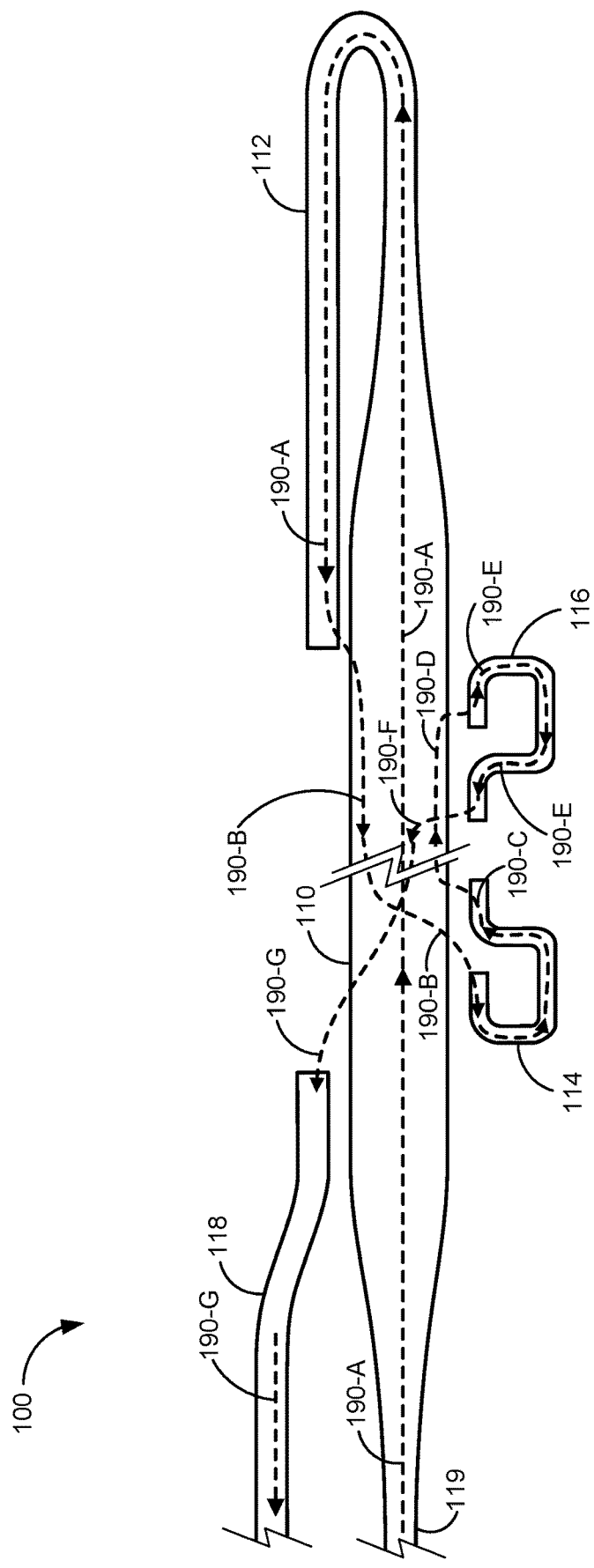
Figure 1E:
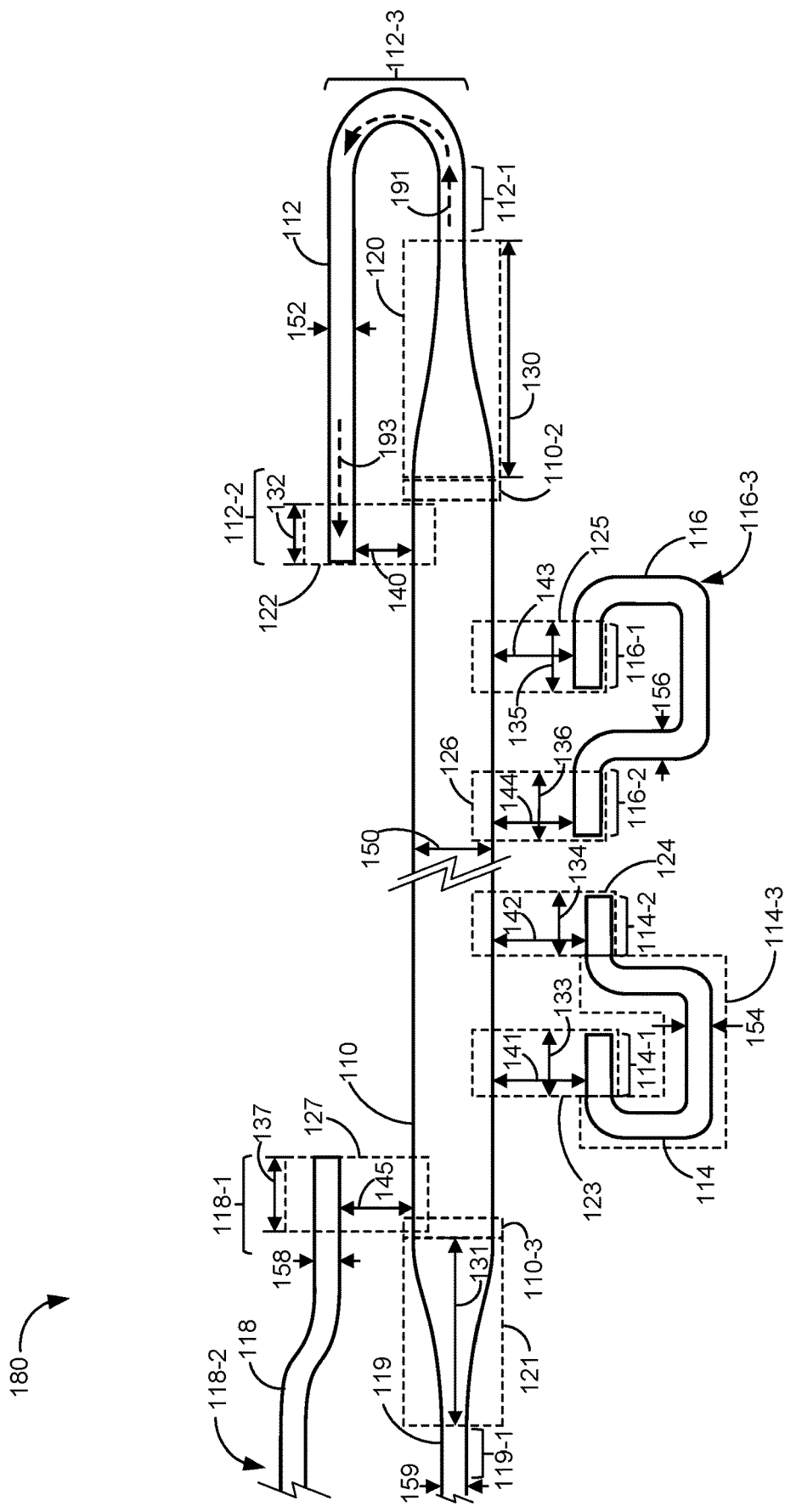
FIG. 1E is a partial plan view of an optical delay device in accordance with some embodiments.
Figure 1F:
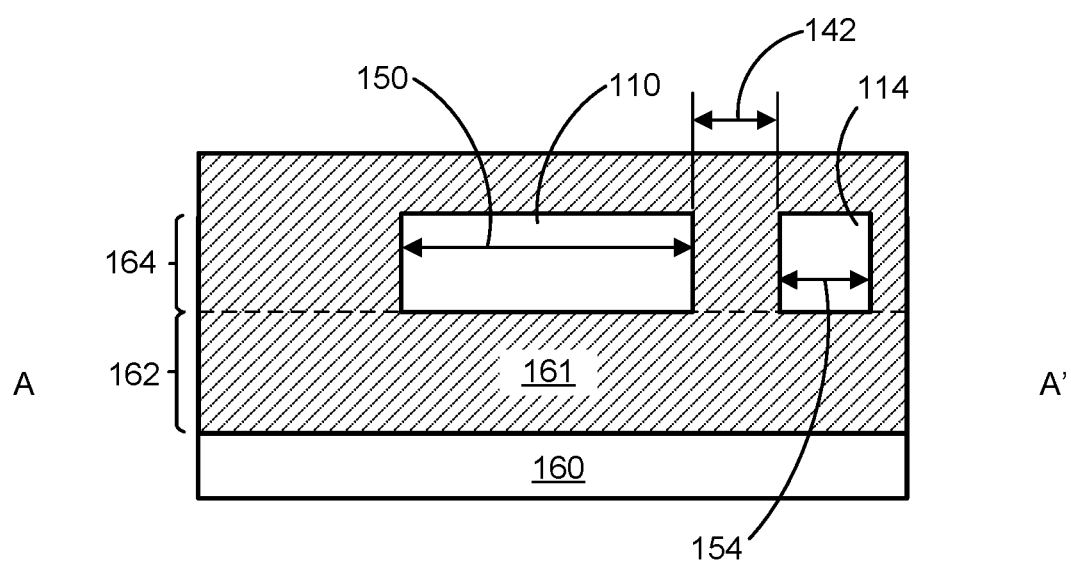
FIG. 1F is a cross-sectional view of the optical delay device shown in FIG. 1A.

Also shown in FIG. 1A are line AA' representing a view from which the cross-section shown in FIG. 1F is taken.

In FIG. 1A, light 190-A is coupled (e.g., through adiabatic coupling) from the fifth waveguide 119 into the multi-mode waveguide 110, and light 190-A propagates along the multi-mode waveguide 110 (including a first portion 110-1 of the multi-mode waveguide 110) and is coupled (e.g., through adiabatic coupling) into the first waveguide 112. In some embodiments, the light 190-A propagates along the first waveguide 112 in the fundamental optical mode (e.g., in a configuration in which the first waveguide 112 is a single-mode waveguide). Light 190-A propagates along the curved portion of the first waveguide 112 and is coupled (e.g., through evanescent coupling) into the multi-mode waveguide 110 as light 190-B, which is, in some embodiments, in a first order optical mode (e.g., $TE_1$).

In FIG. 1B, the light 190-B propagates along at least the first portion 110-1 of the multi-mode waveguide 110 and is coupled (e.g., through evanescent coupling) into the second waveguide 114 as light 190-C. In some embodiments, the light 190-C propagates along the second waveguide 114 in the fundamental optical mode (e.g., in a configuration in which the second waveguide 114 is a single-mode waveguide). The light 190-C propagates along the curved portion of the second waveguide 114 and is coupled (e.g., through evanescent coupling) into the multi-mode waveguide 110 as light 190-D, which is, in some embodiments, in a second order optical mode (e.g., $TE_2$).

Light 190-D propagates along at least the first portion 110-1 of the multi-mode waveguide 110 and is coupled (e.g., through evanescent coupling) into the third waveguide 116 as light 190-E, which is, in some embodiments, in the fundamental optical mode (e.g., in a configuration in which the third waveguide 116 is a single-mode waveguide). The light 190-E propagates along the curved portion of the third waveguide 116.

In FIG. 1C, the light 190-E is coupled from the third waveguide 116 into the multi-mode waveguide 110 as light 190-F, which is, in some embodiments, in a third order optical mode (e.g., $TE_3$). Light 190-F is coupled (e.g., through evanescent coupling) into the fourth waveguide 118 as light 190-G, which is, in some embodiments, in a fundamental optical mode (e.g., in a configuration in which the fourth waveguide 118 is a single-mode waveguide).

In some embodiments, the first order optical mode is different from the fundamental optical mode. In some embodiments, the second order optical mode is different from the fundamental optical mode and the first order optical mode. In some embodiments, the third order optical mode is different from the fundamental optical mode, the first order optical mode, and the second order optical mode. In some embodiments, the first order optical mode, the second order optical mode, and the third order optical mode are higher order optical modes.

FIG. 1D shows the entire optical path of the light propagating in the optical delay device 100.

As described above, the multi-mode waveguide and a respective side waveguide are configured for coupling light between the two waveguides. In particular, the two waveguides are positioned adjacent to each other so that light propagating in the multi-mode waveguide is coupled into the respective side waveguide. More specifically, the refractive index of the multi-mode waveguide, the refractive index of the respective side waveguide, the refractive index of a material located between the multi-mode waveguide and the respective side waveguide, the width of the multi-mode waveguide, the width of the respective side waveguide, the gap between the multi-mode waveguide and the respective side waveguide, and the length of a coupling region in which the multi-mode waveguide and the respective side waveguide remain adjacent to each other are selected so that the a coupling efficiency between the two waveguides is at least 50% for a design wavelength (e.g., a wavelength between 800 nm and 1700 nm, such as 1310 nm and 1550 nm). In some embodiments, the coupling efficiency between the two waveguides is 95% or higher (e.g., 99%).

In addition, the optical modes of light 190-C, light 190-E, light 190-G, and light 190-A while propagating through the first waveguide 112 may differ from the optical modes of light 190-B, light 190-D, and light 190-F. The multi-mode waveguide 110 and a respective side waveguide are configured for coupling light between the two waveguides in two different optical modes. In some embodiments, the width of the multi-mode waveguide 110 and the width of the respective side waveguide are selected to allow transfer of light in a first optical mode in the multi-mode waveguide 110 to light in a second optical mode in the respective side waveguide, and vice versa. In particular, the refractive index of the multi-mode waveguide 110, the refractive index of the respective side waveguide, the refractive index of a material located between the multi-mode waveguide 110 and the respective side waveguide, the width of the multi-mode waveguide 110, the width of the respective side waveguide, the gap between the multi-mode waveguide 110 and the respective side waveguide, and the coupling length are selected so that the light in the first optical mode in the multi-mode waveguide 110 and the light in the second optical mode in the respective side waveguide are phase-matched. For example, in a configuration in which a side waveguide has a width of 1 micron and the multi-mode waveguide 110 has a width of 2.25 microns (for waveguides made out of silicon nitride and for light having 1550 nm wavelength), light in the $TE_0$ mode in the side waveguide may be coupled to light in the $TE_1$ mode in the multi-mode waveguide 110 and the light in the $TE_1$ mode in the multi-mode waveguide 110 may be coupled to the light in the $TE_0$ mode in the side waveguide. In a configuration in which a side waveguide has a width of 1 micron and the multi-mode waveguide 110 has a width of 3.5 microns, the light in the $TE_0$ mode in the side waveguide may be coupled into light in the $TE_2$ mode in the multi-mode waveguide 110 and the light in the $TE_2$ mode in the multi-mode waveguide 110 may be coupled to the light in the $TE_0$ mode in the side waveguide. In addition, the spacing between the two waveguides, and the coupling length are selected to facilitate coupling between two different optical modes in the two waveguides. For example, a coupling length between 30 and 110 microns and a spacing between 0.2 and 0.5 microns may be used for silicon waveguides.

Thus, in some embodiments, the respective side waveguide forms, together with the multi-mode waveguide 110, an asymmetric directional coupler that selectively couples a particular mode in a single-mode/multi-mode waveguide to a specific other mode in an adjacent multi-mode/single-mode waveguide. The asymmetric directional coupler uses two different waveguide widths, a spacing between the two waveguides, and properties of the materials constituting the two waveguides to phase match light propagating in different modes within adjacent waveguides, allowing for efficient coupling. The phase matching is described further with respect to FIG. 1E.

In some embodiments, one or more curved waveguides can operate in a manner analogous to a retroreflector in the sense that both the curved waveguides described herein and retroreflectors send light propagating in one direction back to the opposite direction. However, the curved waveguides described herein do not need any reflector as a way to change the direction of the light like a conventional retroreflector. Instead, the curved waveguides use the total internal reflection along a curved optical path as a way to change the direction of light. In addition, the curved waveguides are positioned to receive light from a source waveguide and inject the direction-changed light back into the source waveguide through directional coupling. Thus, such curved waveguides are also called herein direction-reverting waveguides.

In some embodiments, light propagating within the optical delay device 100 (e.g., light 190-A, 190-B, 190-C, and 190-D) is infrared light. In some embodiments, the light has a center wavelength between 500 nm and 3000 nm (e.g., between 1300 nm and 1700 nm).

In some embodiments, as shown in FIGS. 1A-1D, the optical delay device 100 is configured to enable multiple passes of light through the multi-mode waveguide 110 as follows:
  first pass: light 190-A propagates along the multi-mode waveguide 110;
  second pass: light 190-B propagates along the multi-mode waveguide 110;
  third pass: light 190-D propagates along the multi-mode waveguide 110; and
  fourth pass: light 190-F propagates along the multi-mode waveguide 110.

By causing multiple transmission of light through the multi-mode waveguide 110, the optical delay device 100 can provide an optical path that is longer than the dimension of the optical delay device 100.

In addition, the optical path of the light within the multi-mode waveguide 110 also includes:
  propagagion through the first waveguide 112;
  propagation through the second waveguide 114; and
  propgataion through the third waveguide 116.

FIG. 1E illustrates an optical delay device 180 that is similar to the optical delay device 100, except that, in FIG. 1E, elements are not drawn to scale so as not to obscure certain aspects of the optical delay device 180.

The optical delay device 180 includes the multi-mode waveguide 110 and the first waveguide 112. The multi-mode waveguide 110 has a first end 110-2 and a second end 110-3 that is opposite to the first end 110-2.

In some embodiments, the first end 110-2 of the multi-mode waveguide 110 is coupled to the first waveguide 112 by (e.g., through) a first coupler 120 located between the multi-mode waveguide 110 and the first waveguide 112. In some embodiments, the multi-mode waveguide 110 has a first width 150 and first waveguide 112 has a second width 152. In some embodiments, the first width 150 is greater than second width 152. In some embodiments, the width of the first coupler 120 gradually changes from first width 150 to second width 152. In some embodiments, the first coupler 120 has a first length 130 and is configured to adiabatically couple light between the multi-mode waveguide 110 and the first waveguide 112. For example, the first coupler 120 may have a linear taper profile, a parabolic taper profile, or an exponential taper profile. In some embodiments, the side walls of first coupler 120 have a taper profile with a tapering angle less than 0.3 degrees (e.g., a 0.2 degrees). In some embodiments, the first length 130 is between 10 micrometers and 100 micrometers.

The first waveguide 112 is configured for receiving light from the multi-mode waveguide 110 and feeding the light back into the multi-mode waveguide 110 (e.g., in the same optical mode as the optical mode of the received light or in a different optical mode). The first waveguide 112 includes a first portion 112-1, a second portion 112-2, and a curved portion 112-3 connected to the first portion 112-1 and the second portion 112-2. The first portion 112-1 of the first waveguide 112 is connected to the first coupler 120 so that the first portion 112-1 of the first waveguide 112 can receive first light (e.g., light 190-A shown in FIG. 1A) from the first coupler 120. The second portion 112-2 of the first waveguide 112 is connected to the first portion 112-1 so that the second portion 112-2 of the first waveguide 112 can receive the first light (e.g., light 190-A shown in FIG. 1A) from the first portion 112-1 of the first waveguide 112. In addition, the second portion 112-2 of the first waveguide 112 is configured for coupling the first light to the multi-mode waveguide 110 as second light (e.g., the light 190-B shown in FIG. 1A). For example, the refractive index of the multi-mode waveguide 110, the refractive index of the first waveguide 112, the refractive index of a material located between the multi-mode waveguide 110 and the second portion 112-2 of the first waveguide 112, the width of the multi-mode waveguide 110, the width of the second portion 112-2 of the first waveguide 112, and the gap between the multi-mode waveguide 110 and the second portion 112-2 of the first waveguide 112 are selected so that the first light and the second light are phase-matched. As a result, in some configurations, a single photon propagating in the second portion 112-2 of the first waveguide 112 in a fundamental optical mode (e.g., $TE_0$) is transferred to the multi-mode waveguide 110 as a single photon in a first order optical mode (e.g., $TE_1$).

The curved portion 112-3 connects the first portion 112-1 and the second portion 112-2 of the first waveguide 112 so that the first light propagates in a first direction 191 in the first portion 112-1 of the first waveguide 112 and the first light propagates in a second direction 193 in the second portion 112-2 of the first waveguide 112. In some embodiments, as shown in FIG. 1A, the second direction 193 is opposite to the first direction 191. In some embodiments, the curved portion 112-3 has a radius of curvature between 5 and 100 micrometers (for a silicon waveguide having a thickness between 200 and 300 nm).

In some embodiments, the second portion 112-2 of the first waveguide 112 and a portion of the multi-mode waveguide 110 form a first coupling region 122. The first coupling region 122 has a second length 132. In some configurations, the second length 132 is selected to achieve a particular coupling efficiency (e.g., a coupling efficiency above 50%, such as more than 95%, more than 99%, more than 99.9%, etc.) between the second portion 112-2 of the first waveguide 112 and the multi-mode waveguide 110. For example, the second length 132 may be between 10 and 300 micrometers, although a different length may be used. In some embodiments, within the first coupling region 122, the second portion 112-2 of the first waveguide 112 is spaced apart from the portion of the multi-mode waveguide 110 (e.g., a portion of the multi-mode waveguide 110 that is within the first coupling region 122) by a first separation distance 140. For example, a side wall of the second portion 112-2 of first waveguide 112 and a side wall of the portion of the multi-mode waveguide 110, disposed adjacent to the side wall of the second portion 112-2 of first waveguide 112, are spaced apart by the first separation distance 140. In some embodiments, the first separation distance 140 is between 0.1 and 0.5 micrometer. In some embodiments, the side wall of the second portion 112-2 of first waveguide 112 is parallel to the side wall of the multi-mode waveguide 110.

In some embodiments, the optical delay device 100 includes a second waveguide 114. The second waveguide 114 is configured for receiving light from the multi-mode waveguide 110 and feeding the light back into the multi-mode waveguide 110 (e.g., in the same optical mode as the optical mode of the received light or in a different optical mode). The second waveguide 114 includes a first portion 114-1 and a second portion 114-2. The first portion 114-1 of the second waveguide 114 is configured for coupling the second light (e.g., light 190-B) from the multi-mode waveguide 110 to the first portion 114-1 of the second waveguide 114 as third light (e.g., light 190-C shown in FIG. 1). For example, the refractive index of the multi-mode waveguide 110, the refractive index of the second waveguide 114, the refractive index of a material located between the multi-mode waveguide 110 and the first portion 114-1 of the second waveguide 114, the width of the multi-mode waveguide 110, the width of the first portion 114-1 of the second waveguide 114, and the gap between the multi-mode waveguide 110 and the first portion 114-1 of the second waveguide 114 are selected so that the second light and the third light are phase-matched. As a result, in some configurations, a single photon propagating in the multi-mode waveguide 110 in the first order optical mode (e.g., $TE_1$) is transferred to the first portion 114-1 of the second waveguide 114 as a single photon in the fundamental optical mode (e.g., $TE_0$). In such configurations, the third light (e.g., light 190-C shown in FIG. 1B) propagates in the fundamental optical mode along the second waveguide 114. The second portion 114-2 of the second waveguide 114 is connected to the first portion 114-1 of the second waveguide 114 so that the second portion 114-2 of the second waveguide 114 can receive the third light from the first portion 114-1 of the second waveguide 114. In addition, the second portion 114-2 of the second waveguide 114 is configured for coupling (e.g., through evanescent coupling) the third light (e.g., light 190-C shown in FIG. 1B) from the second portion 114-2 of the second waveguide 114 to the multi-mode waveguide 110 as fourth light (e.g., light 190-D shown in FIG. 1i). For example, the refractive index of the multi-mode waveguide 110, the refractive index of the second waveguide 114, the refractive index of a material located between the multi-mode waveguide 110 and the second portion 114-2 of the second waveguide 114, the width of the multi-mode waveguide 110, the width of the second portion 114-2 of the second waveguide 114, and the gap between the multi-mode waveguide 110 and the second portion 114-2 of the second waveguide 114 are selected so that the third light and the fourth light are phase-matched. As a result, in some configurations, a single photon propagating in the second portion 114-2 of the second waveguide 114 in the fundamental optical mode (e.g., $TE_0$) is transferred to the multi-mode waveguide 110 as a single photon in the second order optical mode (e.g., $TE_2$).

In some embodiments, the first portion 114-1 of the second waveguide 114 and a portion of the multi-mode waveguide 110 form a second coupling region 123. The second coupling region 123 has a third length 133. In some configurations, the third length 133 is selected to achieve a particular coupling efficiency (e.g., a coupling efficiency above 50%, such as more than 95%, more than 99%, more than 99.9%, etc.) between the first portion 114-1 of the second waveguide 114 and the multi-mode waveguide 110. For example, the third length 133 may be between 10 and 300 micrometers, although a different length may be used. In some embodiments, the first portion 114-1 of the second waveguide 114 is spaced apart from the portion of the multi-mode waveguide 110 by a second separation distance 141. For example, a side wall of the first portion 114-1 of the second waveguide 114 and a side wall of a portion of the multi-mode waveguide 110, disposed adjacent to the side wall of the first portion 114-1 of the second waveguide 114, are spaced apart by the second separation distance 141. In some embodiments, the second separation distance 141 is between 0.1 and 0.5 micrometer. In some embodiments, the second separation distance 141 is different from the first separation distance 140. In some embodiments, the second separation distance 141 is the same as the first separation distance 140. In some embodiments, the side wall of the first portion 114-1 of the second waveguide 114 is parallel to the side wall of the portion of the multi-mode waveguide 110 that is within the second coupling region 123.

In some embodiments, the second portion 114-2 of the second waveguide 114 and a portion of the multi-mode waveguide 110 that is coupled to the second portion 114-2 form a third coupling region 124. The third coupling region 124 has a fourth length 134. In some configurations, the fourth length 134 is selected to achieve a particular coupling efficiency (e.g., a coupling efficiency above 50%, such as more than 95%, more than 99%, more than 99.9%, etc.) between the second portion 114-2 of the second waveguide 114 and the multi-mode waveguide 110. For example, the fourth length 134 may be between 10 and 300 micrometers, although a different length may be used. In some embodiments, the second portion 114-2 of the second waveguide 114 is spaced apart from a portion of the multi-mode waveguide 110 by a third separation distance 142. For example, a side wall of the second portion 114-2 of the second waveguide 114 and a side wall of a portion of the multi-mode waveguide 110, disposed adjacent to the side wall of the second portion 114-2, are spaced apart by the third separation distance 142. In some embodiments, the third separation distance 142 is between 0.1 and 0.5 micrometer. In some embodiments, the third separation distance 142 is different from one or more of the first separation distance 140 and the second separation distance 141. In some embodiments, the side wall of the second portion 114-2 of the second waveguide 114 is parallel to the side wall of a portion of the multi-mode waveguide 110 that is within the third coupling region 124.

In some embodiments, the second waveguide 114 includes a curved portion 114-3 connecting the first portion 114-1 of the second waveguide 114 to the second portion 114-2 of the second waveguide 114 so that light propagates in the first portion 114-1 of the second waveguide 114 in a third direction (e.g., from right to left) and the light propagates in the second portion 114-2 of the second waveguide 114 in a fourth direction (e.g., from left to right) that is different from the third direction.

In some embodiments, the second waveguide 114 has a third width 154. In some embodiments, the third width 154 is smaller than the first width 150. In some embodiments, the third width 154 is the same as the second width 152. In some embodiments, the third width 154 is different from the second width 152.

In some embodiments, the optical delay device 100 includes a third waveguide 116. The third waveguide 116 is configured for receiving light from the multi-mode waveguide 110 and feeding the light back into the multi-mode waveguide 110 (e.g., in the same optical mode as the optical mode of the received light or in a different optical mode). The third waveguide 116 includes a first portion 116-1 and a second portion 116-2. The first portion 116-1 of the third waveguide 116 is configured for coupling (e.g., evanescent coupling) the fourth light (e.g., light 190-D shown in FIG. 1B) from the multi-mode waveguide 110 to the first portion 116-1 of the third waveguide 116 as fifth light (e.g., light 190-E shown in FIG. 1). For example, the refractive index of the multi-mode waveguide 110, the refractive index of the third waveguide 116, the refractive index of a material located between the multi-mode waveguide 110 and the third waveguide 116, the width of the multi-mode waveguide 110, the width of the first portion 116-1 of the third waveguide 116, and the gap between the multi-mode waveguide 110 and the first portion 116-1 of the third waveguide 116 are selected so that the fourth light and the fifth light are phase-matched. As a result, in some configurations, a single photon propagating in the multi-mode waveguide 110 in the second order optical mode (e.g., $TE_2$) is transferred to the first portion 116-1 of the third waveguide 116 as a single photon in the fundamental optical mode (e.g., $TE_0$). In such configurations, the fifth light (e.g., light 190-E shown in FIG. 1B) propagates in the fundamental optical mode along the third waveguide 116. The second portion 116-2 of the third waveguide 116 is connected to the first portion 116-1 of the third waveguide 116 so that the second portion 116-2 of the third waveguide 116 can receive the fifth light from the first portion 116-1 of the third waveguide 116. In addition, the second portion 116-2 of the third waveguide 116 is configured for coupling (e.g., evanescent coupling) the fifth light (e.g., light 190-E shown in FIG. 1B) from the second portion 116-2 of the third waveguide 116 to the multi-mode waveguide 110 as sixth light (e.g., light 190-F shown in FIG. 1C). For example, the refractive index of the multi-mode waveguide 110, the refractive index of the third waveguide 116, the refractive index of a material located between the multi-mode waveguide 110 and the second portion 116-2 of the third waveguide 116, the width of the multi-mode waveguide 110, the width of the second portion 116-2 of the third waveguide 116, and the gap between the multi-mode waveguide 110 and the second portion 116-2 of the third waveguide 116 are selected so that the fifth light and the sixth light are phase-matched. As a result, in some configurations, a single photon propagating in the second portion 116-2 of the third waveguide 116 in the fundamental optical mode (e.g., $TE_0$) is transferred to the multi-mode waveguide 110 as a single photon in the third order optical mode (e.g., $TE_3$). In addition, the coupling length is selected to achieve a particular coupling efficiency (e.g., a coupling efficiency above 50%, such as more than 95%, more than 99%, more than 99.9%, etc.) between the multi-mode waveguide 110 and the second portion 116-2 of the third waveguide 116.

In some embodiments, the first portion 116-1 of the third waveguide 116 and a portion of the multi-mode waveguide 110 form a fourth coupling region 125. The fourth coupling region 125 has a fifth length 135. In some configurations, the fifth length 135 is selected to achieve a particular coupling efficiency (e.g., a coupling efficiency above 50%, such as more than 95%, more than 99%, more than 99.9%, etc.) between the multi-mode waveguide 110 and the first portion 116-1 of the third waveguide 116. For example, the fifth length 135 may be between 10 and 300 micrometers, although a different length may be used. In some embodiments, the first portion 116-1 of the third waveguide 116 is spaced apart from a portion of the multi-mode waveguide 110 by a fourth separation distance 143. For example, a side wall of the first portion 116-1 of the third waveguide 116 and a side wall of a portion of the multi-mode waveguide 110, disposed adjacent to the side wall of the first portion 116-1 of the third waveguide 116, are spaced apart by the fourth separation distance 143. In some embodiments, the fourth separation distance 143 is between 0.1 and 0.5 micrometer. In some embodiments, the fourth separation distance 143 is different from one or more of the first separation distance 140, the second separation distance 141, and the third separation distance 142. In some embodiments, the fourth separation distance 143 is the same as at least one of the first separation distance 140, the second separation distance 141, and the third separation distance 142. In some embodiments, the side wall of the first portion 116-1 of the third waveguide 116 is parallel to the side wall of a portion of the multi-mode waveguide 110 that is within the fourth coupling region 125.

In some embodiments, the second portion 116-2 of the third waveguide 116 and a portion of the multi-mode waveguide 110 form a fifth coupling region 126. The fifth coupling region 126 has a sixth length 136. In some configurations, the sixth length 136 is selected to achieve a particular coupling efficiency (e.g., a coupling efficiency above 50%, such as more than 95%, more than 99%, more than 99.9%, etc.) between the multi-mode waveguide 110 and the second portion 116-2 of the third waveguide 116. For example, the sixth length 136 may be between 10 and 300 micrometers, although a different length may be used. In some embodiments, the second portion 116-2 of the third waveguide 116 is spaced apart from a portion of the multi-mode waveguide 110 by a fifth separation distance 144. For example, a side wall of the second portion 116-2 of the third waveguide 116 and a side wall of a portion of the multi-mode waveguide 110, disposed adjacent to the side wall of the second portion 116-2, are spaced apart by the fifth separation distance 144. In some embodiments, the fifth separation distance 144 is between 0.1 and 0.5 micrometer. In some embodiments, the fifth separation distance 144 is different from one or more of the first separation distance 140, the second separation distance 141, the third separation distance 142, and the fourth separation distance 143. In some embodiments, the side wall of the second portion 116-2 of the third waveguide 116 is parallel to the side wall of a portion of the multi-mode waveguide 110 that is within the fifth coupling region 126.

In some embodiments, the third waveguide 116 includes a curved portion 116-3 connecting the first portion 116-1 of the third waveguide 116 to the second portion 116-2 of the third waveguide 116 so that light propagates in the first portion 116-1 of the third waveguide 116 in a fifth direction (e.g., from left to right) and the light propagates in the second portion 116-2 of the third waveguide 116 in a sixth direction (e.g., from right to left) that is different from the fifth direction.

In some embodiments, the third waveguide 116 has a fourth width 156. In some embodiments, the fourth width 156 is smaller than first width 150. In some embodiments, fourth width is the same as at least one of the second width 152 and the third width 154. In some embodiments, the fourth width 156 is different from second width 152 and the third width 154.

In some embodiments, the optical delay device 100 includes a fourth waveguide 118. The fourth waveguide 118 includes a first portion 118-1 configured for coupling the sixth light (e.g., light 190-F) from the multi-mode waveguide 110 to the first portion 118-1 of the fourth waveguide 118 as seventh light (e.g., light 190-G shown in FIG. 1C). For example, the refractive index of the multi-mode waveguide 110, the refractive index of the fourth waveguide 118, the refractive index of a material located between the multi-mode waveguide 110 and the first portion 118-1 of the fourth waveguide 118, the width of the multi-mode waveguide 110, the width of the first portion 118-1 of the fourth waveguide 118, and the gap between the multi-mode waveguide 110 and the first portion 118-1 of the fourth waveguide 118 are selected so that the sixth light and the seventh light are phase-matched. As a result, in some configurations, a single photon propagating in the multi-mode waveguide 110 in the third order optical mode (e.g., $TE_3$) is transferred to the first portion 118-1 of the fourth waveguide 118 as a single photon in the fundamental optical mode (e.g., $TE_0$).

The fourth waveguide 118 also includes a second portion 118-2 configured as an output port (e.g., the second portion 118-2 is coupled to an optical coupler for providing light to an optical waveguide located outside the optical delay device 100) or configured to enable propagation of the seventh light (e.g., light 190-G) toward the output port.

In some embodiments, the first portion 118-1 of fourth waveguide 118 and a portion of the multi-mode waveguide 110 form a sixth coupling region 127. The sixth coupling region 127 has a seventh length 137. In some configurations, the seventh length 137 is selected to achieve a particular coupling efficiency (e.g., a coupling efficiency above 50%, such as more than 95%, more than 99%, more than 99.9%, etc.) between the multi-mode waveguide 110 and the first portion 118-1 of the fourth waveguide 118. For example, the seventh length 137 may be between 10 and 300 micrometers, although a different length may be used. In some embodiments, the first portion 118-1 of fourth waveguide 118 is spaced apart from a portion of the multi-mode waveguide 110 by a sixth separation distance 145. For example, a side wall of the first portion 118-1 of fourth waveguide 118 and a side wall of a portion of the multi-mode waveguide 110, disposed adjacent to the side wall of the first portion 118-1 of fourth waveguide 118, are spaced apart by the sixth separation distance 145. In some embodiments, the sixth separation distance 145 is between 0.1 and 0.5 micrometer. In some embodiments, the sixth separation distance 145 is different from one or more of the first separation distance 140, the second separation distance 141, the third separation distance 142, the fourth separation distance 143, and the fifth separation distance 144. In some embodiments, the sixth separation distance 145 is the same as at least one of the first separation distance 140, the second separation distance 141, the third separation distance 142, the fourth separation distance 143, and the fifth separation distance 144. In some embodiments, the side wall of the first portion 118-1 of fourth waveguide 118 is parallel to the side wall of a portion of the multi-mode waveguide 110 that is within the sixth coupling region 127.

In some embodiments, the fourth waveguide 118 has a fifth width 158. In some embodiments, the fifth width 158 is smaller than first width 150. In some embodiments, the fifth width 158 is the same as at least one of the second width 152, the third width 154, and the fourth width 156. In some embodiments, the fifth width 158 is different from the second width 152, the third width 154, and the fourth width 156.

In some embodiments, the optical delay device 100 includes a second coupler 121 that is located between the fifth waveguide 119 and the multi-mode waveguide 110. The fifth waveguide 119 is configured as an input port (e.g., the fifth waveguide 119 is connected to an optical coupler for receiving light from an optical waveguide located outside the optical delay device 100) or configured to receive light from the input port.

In some embodiments, the fifth waveguide 119 has a sixth width 159. In some embodiments, the sixth width 159 is smaller than the first width 150. In some embodiments, the sixth width 159 is the same as at least one of the second width 152, the third width 154, the fourth width 156, and fifth width 158. In some embodiments, the sixth width 159 is different from the second width 152, the third width 154, the fourth width 156, and fifth width 158.

The second coupler 121 is configured for coupling (e.g., through adiabatic coupling) of the first light (e.g., light 190-A) from the fifth waveguide 119 to the second end 110-3 of the multi-mode waveguide 110 (e.g., the second coupler 121 is connected to the fifth waveguide 119 and the second end 110-3). For example, the second coupler 121 is directly connected to the fifth waveguide 119 and the second end 110-3 of the multi-mode waveguide 110 so that the first light can propagate from the fifth waveguide 119 to the multi-mode waveguide 110 through the second coupler 121.

In some embodiments, the second coupler 121 has an eighth length 131. In some embodiments, the eighth length 131 is between 10 micrometers and 100 micrometers. In some embodiments, the width of the second coupler 121 changes from the sixth width 159 to the first width 150. In some embodiments, the second coupler 121 has side walls that have a profile that is one of a linear taper, an exponential taper, and a parabolic taper. In some embodiments, the side walls of second coupler 121 have a linear taper profile with a tapering angle that is less than 0.3 degrees.

FIG. 1F illustrates a cross-sectional view of the optical delay device 100 taken along line AA' shown in FIG. 1A. The multi-mode waveguide 110, having the first width 150, is separated from the second waveguide 114, having the third width 154, by the third separation distance 142.

In some embodiments, the multi-mode waveguide 110 and the second waveguide 114 are located over a substrate 160 (e.g., a semiconductor substrate, such as a silicon substrate). In some embodiments, the optical delay device 100 includes the substrate 160, a layer 164 that includes the multi-mode waveguide 110 and the second waveguide 114, and a layer 162 located between the substrate 160 and the layer 164. The layer 162 includes a continuous layer of a first material 161 (e.g., a silicon oxide such as SiO2) having a first refractive index, corresponding to a cladding of an optical waveguide. The layer 164 includes the first material 161 and a second material (e.g., silicon, silicon nitride, silicon oxynitride, indium phosphide, gallium arsenide, aluminum gallium arsenide, lithium niobate, or any other suitable photonic material including silicon and/or germanium based materials) having a second refractive index, different from the first refractive index, for the waveguides 110 and 114. In some embodiments, the second material corresponds to a core material of an optical waveguide.

Figure 1G:
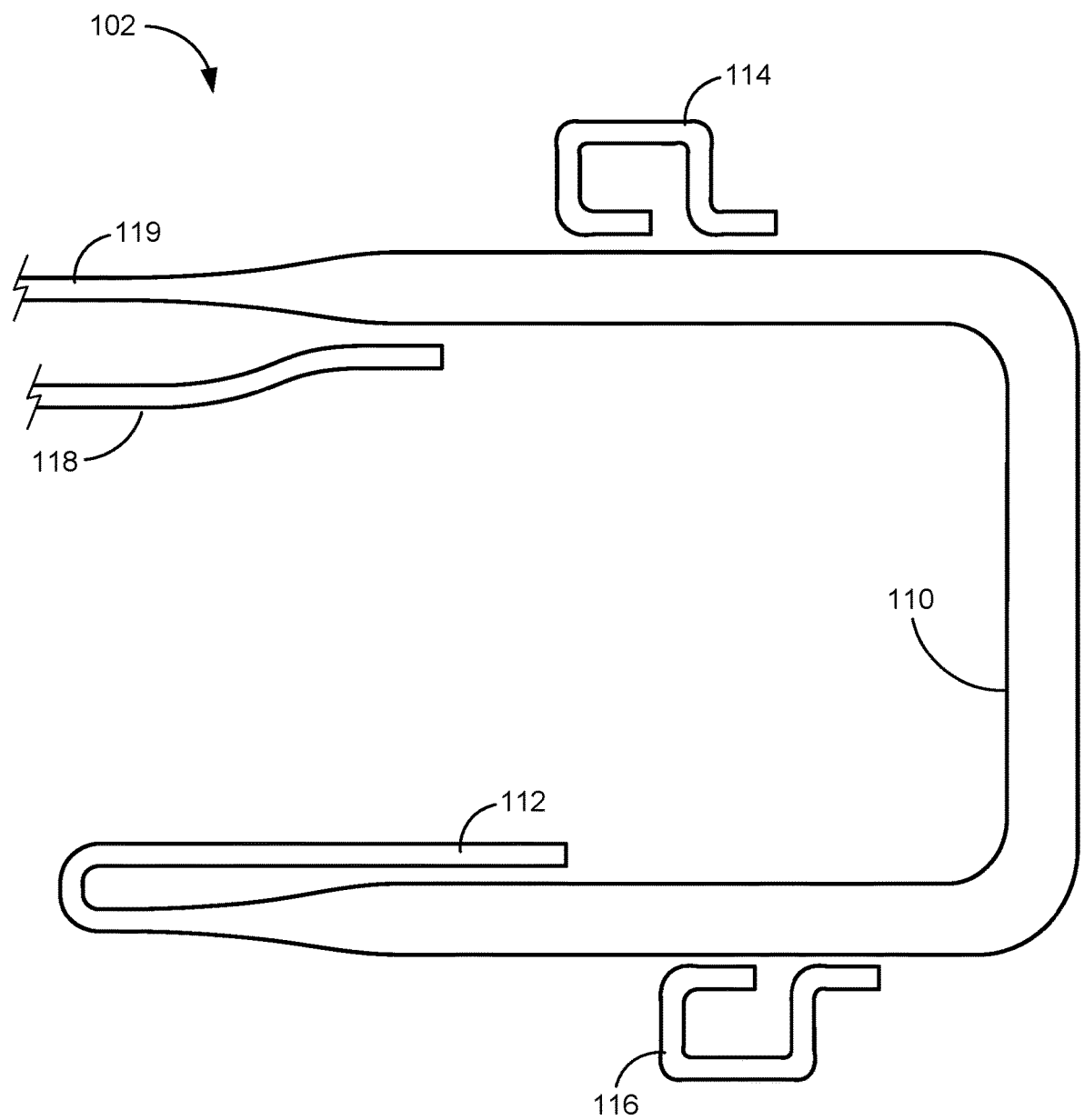
FIG. 1G is a partial plan view of an optical delay device in accordance with some embodiments.

FIG. 1G illustrates a plan view of optical delay device 102 in accordance with some embodiments. Optical delay device 102 is similar to the optical delay device 100 except that the multi-mode waveguide 110 is curved in the optical delay device 102. In some embodiments, the multi-mode waveguide 110 includes a bend having a radius of curvature that is greater than 4 micrometers (for a silicon waveguide). The optical path of light transmitted through the optical delay device 102 is similar to the optical path of light transmitted through the optical delay device 100 and is not repeated herein for brevity.

Figure 1H:
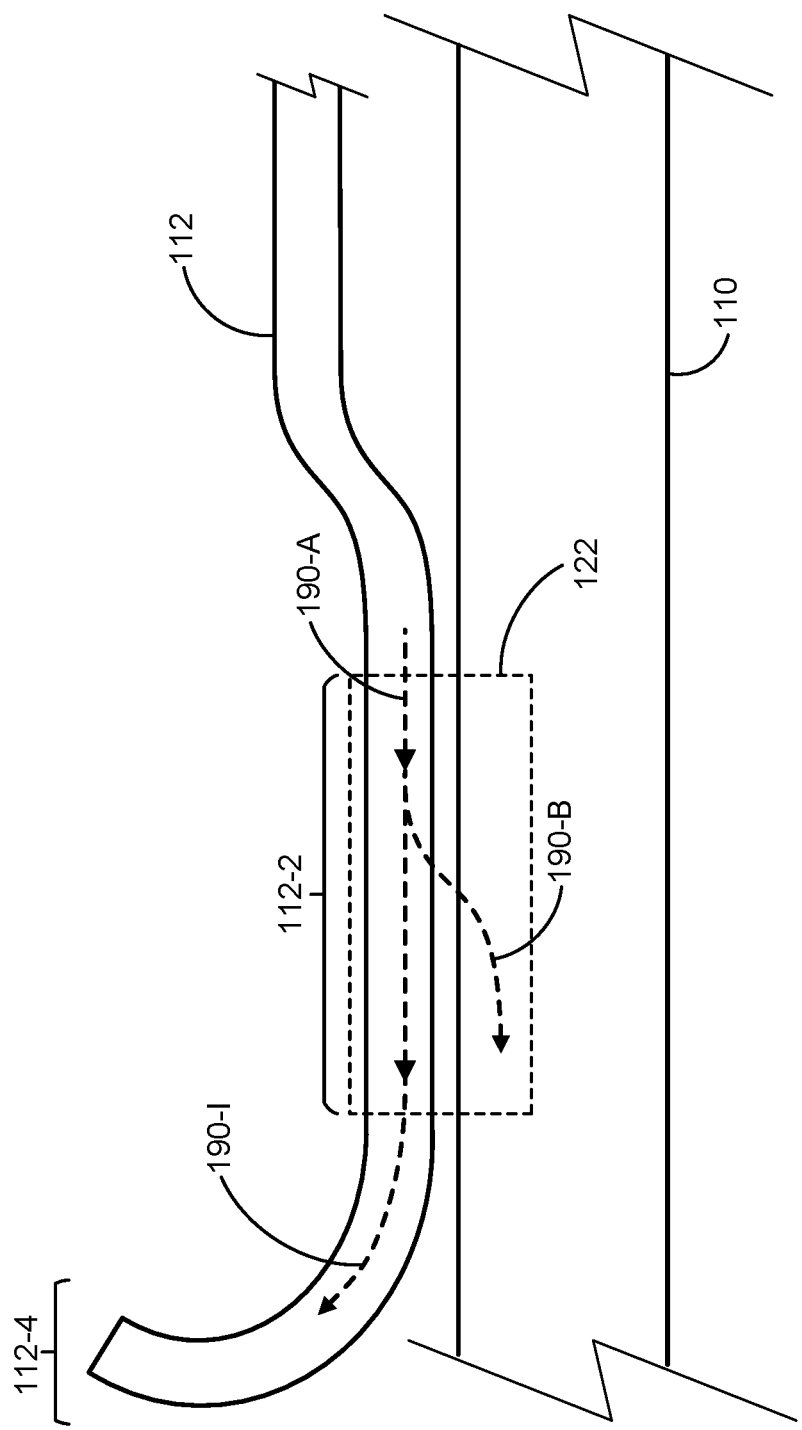
FIG. 1H illustrates example termination of a waveguide in accordance with some embodiments.

FIG. 1H illustrates example termination of a waveguide in accordance with some embodiments. In some embodiments, the first waveguide 112 includes, instead of a straight waveguide end shown in FIG. 1A, a curved waveguide end 112-4 that is located further away from the multi-mode waveguide 110 than the second portion 112-2 of the first waveguide 112 so that the waveguide end 112-4 receives light 190-I that corresponds to a portion of the light 190-A that is not coupled from the second portion 112-2 to the multi-mode waveguide 110 and directs the light 190-I away from the multi-mode waveguide 110 so that the light 190-I is not coupled from the first waveguide 112 to the multi-mode waveguide 110. In some embodiments, at least one of the second waveguide 114 and the third waveguide 116 has termination that is similar to the waveguide end 112-4. In some embodiments, the first waveguide 112 does not include a curved waveguide end.

Figure 2A:
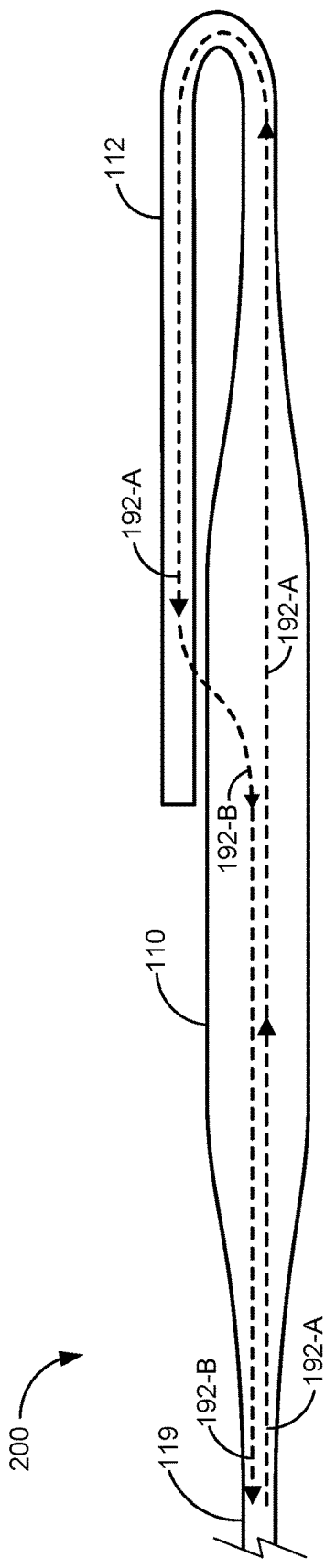
FIGS. 2A-2C are partial plan views of optical delay devices in accordance with some embodiments.

FIG. 2A is a partial plan view of an optical delay device 200 in accordance with some embodiments. The optical delay device 200 includes the multi-mode waveguide 110 and the first waveguide 112 as described above with respect to FIGS. 1A-1E. However, the optical delay device 200 does not include the second waveguide 114, the third waveguide 116, and the fourth waveguide 118 shown in FIGS. 1A-1E.

Light 192-A and 192-B propagate in the optical delay device 200 in a manner similar to that of light 190-A and 190-B, respectively, described above with respect to FIG. 1A, except that the light 192-B propagates along the multi-mode waveguide 110 and is coupled (e.g., through adiabatic coupling) into the fifth waveguide 119. In addition, the light 192-B may be in the fundamental optical mode or a higher order optical mode. For example, the light 192-A propagating in the fundamental optical mode in the multi-mode waveguide 110 may be coupled back through the first waveguide 112 to the multi-mode waveguide 110 as the light 192-B that also propagates in the fundamental optical mode, although the light 192-A and the light 192-B propagate into opposite directions.

Figure 2B:
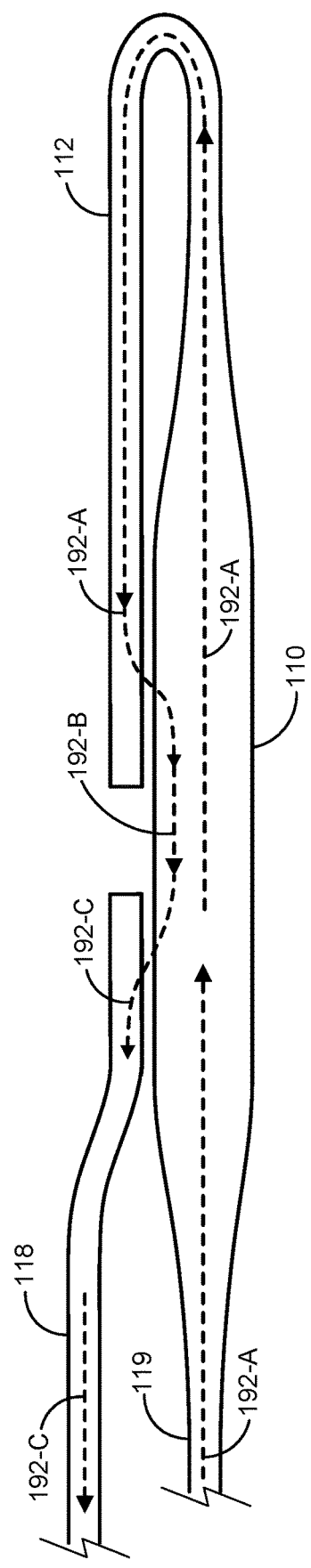

FIG. 2B is a partial plan view of an optical delay device 202 in accordance with some embodiments. The optical delay device 202 is similar to the optical delay device 200 except that the optical delay device 202 also includes the fourth waveguide 118 so that the light 192-B is coupled (e.g., through evanescently) from the multi-mode waveguide 110 into the fourth waveguide 118 as light 192-C. In a configuration in which the fourth waveguide 118 is a single mode waveguide, the light 192-C propagates along the fourth waveguide 118 in the fundamental optical mode.

In the optical delay devices 200 and 202, the light provided to the optical delay device 200 or 202 passes through the multi-mode waveguide 110 twice so that the optical path of the light is longer than the length of the multi-mode waveguide 110 (e.g., the optical path of the light within the optical delay device 200 or 202 is approximately twice the length of the multi-mode waveguide 110).

Figure 2C:
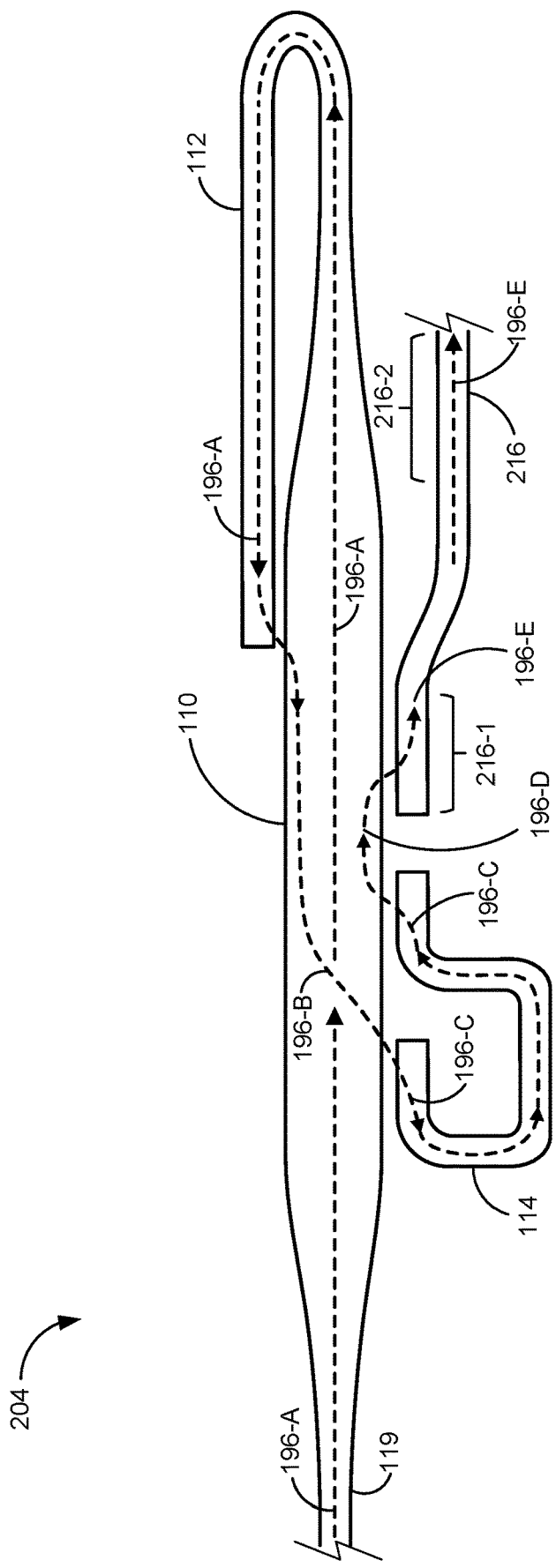

FIG. 2C is a partial plan view of an optical delay device 204 in accordance with some embodiments. The optical delay device 204 is similar to the optical delay device 200 except that the optical delay device 204 also includes the second waveguide 114 and a waveguide 216. The second waveguide 114 is described above with respect to FIGS. 1A-1E, and its description is not repeated herein for brevity. Light 196-A, 196-B, 196-C, and 196-D is similar to light 190-A, 190-B, 190-C, and 190-D respectively, described above with respect to FIGS. 1A and 1B. Light 196-D is coupled (e.g., through evanescent coupling) from the multi-mode waveguide 110 into a portion 216-1 of the waveguide 216 as light 196-E. In a configuration in which the waveguide 216 is a single-mode waveguide, the light 196-E propagates along the waveguide 216 in the fundamental optical mode. In some embodiments, the waveguide 216 has an end portion 216-2 configured as an output port.

In the optical delay device 204, the light provided to the optical delay device 204 passes through the multi-mode waveguide 110 three times so that the optical path of the light is longer than the length of the multi-mode waveguide 110 (e.g., the optical path of the light within the optical delay device 204 is approximately three times the length of the multi-mode waveguide 110).

FIGS. 3A-3F illustrate example coupling regions of an optical delay device in accordance with some embodiments. One or more of the coupling regions 122, 123, 124, 125, 126, and 127 shown in FIG. 1E may be configured as any of the coupling regions illustrated in FIGS. 3A-3F.

Figure 3A:
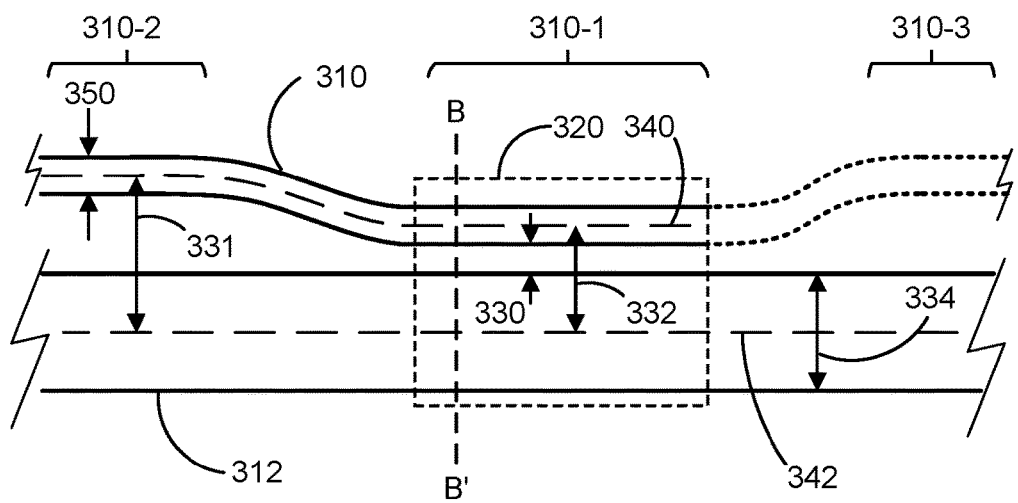
FIG. 3A is a partial plan view of a coupling region of the optical delay device in accordance with some embodiments.

FIG. 3A illustrates a coupling region 320 including a portion of a waveguide 310 and a portion of a multi-mode waveguide 312. The waveguide 310 has a first portion 310-1 that is separated from the multi-mode waveguide 312 by a first separation distance 330 and has a first center-to-center distance 332 (the distance between the center line 340 of the waveguide 310 and the center line 342 of the multi-mode waveguide 312) to the multi-mode waveguide 312 so that light in the first portion 310-1 of the waveguide 310 can be coupled to the multi-mode waveguide 312 and light in the multi-mode waveguide 312 can be coupled to the first portion 310-1 of the waveguide 310. The waveguide 310 also has a second portion 310-2 that has a second center-to-center distance 331 to the multi-mode waveguide 312 outside the coupling region 320. The second center-to-center distance 331 is greater than the first center-to-center distance 332 so that light in the first portion 310-1 of the waveguide 310 is not coupled to the multi-mode waveguide 312 and light in the multi-mode waveguide 312 is not coupled to the first portion 310-1 of the waveguide 310 (e.g., outside the coupling region 320).

Similar to the multi-mode waveguide 110 shown in FIGS. 1A-1E, the multi-mode waveguide 312 has a uniform width 334. The waveguide 310 also has a uniform width 350.

In some embodiments, the waveguide 310 includes a third portion 310-3 that is located on the opposite side of the second portion 310-2 from the first portion 310-1 so that the first portion 310-1 is located between the second portion 310-2 and the third portion 310-3. The third portion 310-3 has a center-to-center distance greater than the first center-to-center distance 332 to the multi-mode waveguide 312 (e.g., the third portion 310-3 has the second center-to-center distance 331 to the multi-mode waveguide 312). In some embodiments, the third portion 310-3 is a curved waveguide end as shown in FIG. 1H. In some embodiments, the waveguide 310 does not include a third portion 310-3 (e.g., the waveguide 310 terminates at the end of the coupling region 320).

Figure 3B:
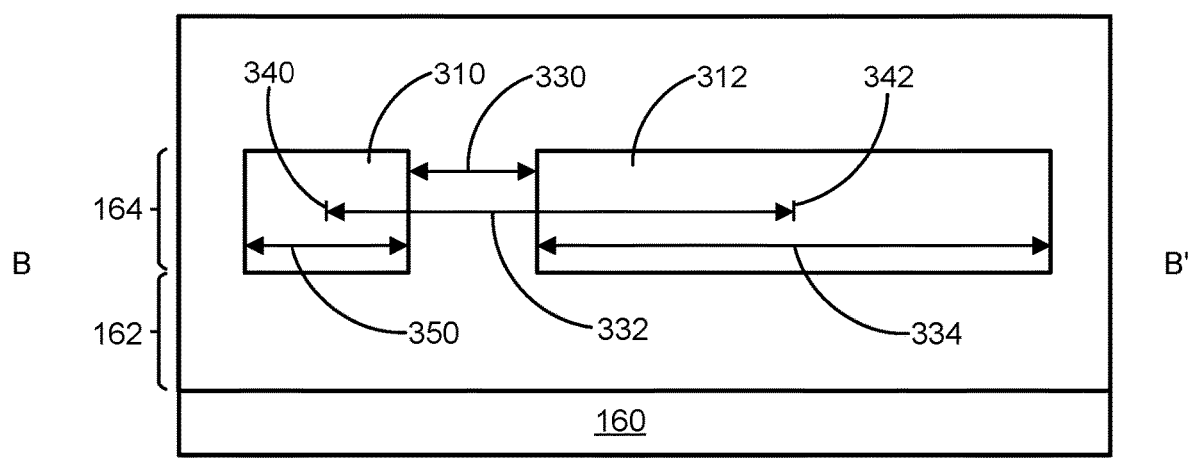
FIG. 3B is a cross-sectional view of the coupling region shown in FIG. 3A.

Also shown in FIG. 3A is line BB' representing a view from which the cross-section shown in FIG. 3B is taken. FIG. 3B illustrates that the waveguide 310 and the multi-mode waveguide 312 are located in a same layer 164 over the substrate 160. In some embodiments, another layer 162 is located between the layer 164 and the substrate 160.

In some cases, the large width of the multi-mode waveguide 312 may reduce the coupling efficiency in coupling light between the waveguide 310 and the multi-mode waveguide 312, depending on the width of the multi-mode waveguide 312. When a higher coupling efficiency is desired, an example configuration shown in FIGS. 3C and 3D or an example configuration shown in FIGS. 3E and 3F may be implemented instead of the configuration shown in FIGS. 3A and 3B.

Figure 3C:
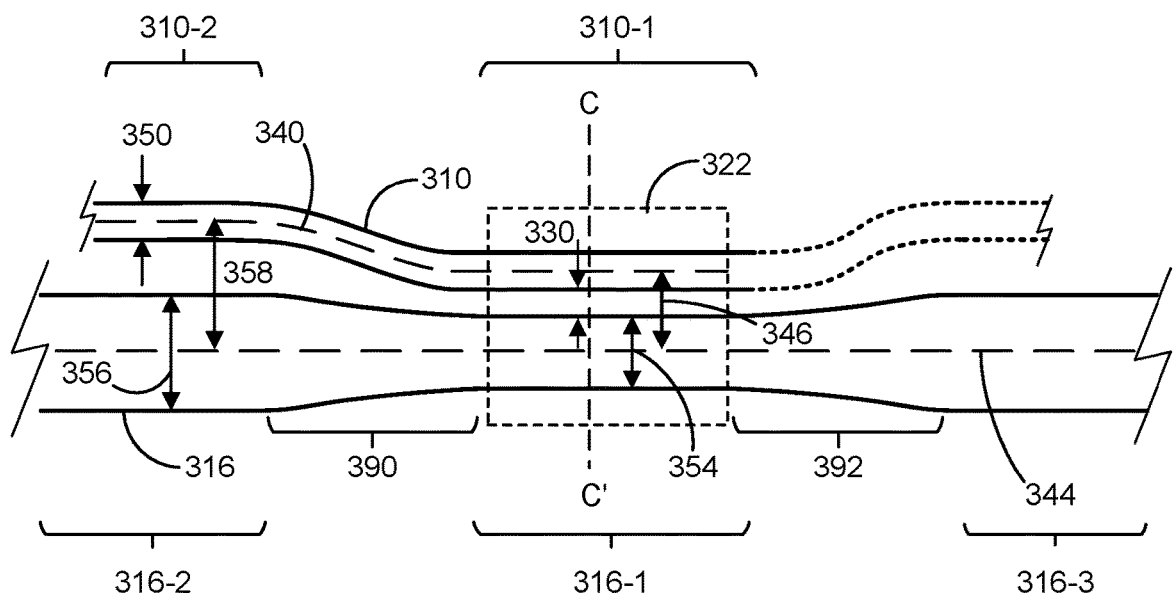
FIG. 3C is a plan view of a coupling region of the optical delay device in accordance with some embodiments.

FIG. 3C illustrates a coupling region 322 including a portion of the waveguide 310 and a portion of a multi-mode waveguide 316, in which the center-to-center distance 346 between the waveguide 310 and the multi-mode waveguide 316 is less than the center-to-center distance 332 in FIG. 3A. The waveguide 310 is described above with respect to FIG. 3A and its description is not repeated herein for brevity.

The multi-mode waveguide 316 has a coupling multi-mode portion 316-1 and a non-coupling multi-mode portion 316-2. The coupling multi-mode portion 316-1 is configured for coupling light from the first portion 310-1 of the waveguide 310 to the coupling multi-mode portion 316-1 (e.g., the center-to-center distance 346 is selected to enable coupling of light from the first portion 310-1 of the waveguide 310 to the coupling multi-mode portion 316-1 of the multi-mode waveguide 316). The non-coupling multi-mode portion 316-2 has a width that is greater than the width of the coupling multi-mode portion 316-1, and the center-to-center distance 358 is greater than the center-to-center distance 346 so that light in the second portion 310-2 of the waveguide 310 is not coupled to the multi-mode waveguide 312 and light in the multi-mode waveguide 312 is not coupled to the second portion 310-2 of the waveguide 310 (e.g., outside the coupling region 322). The non-coupling multi-mode portion 316-2 is connected to the coupling multi-mode portion 316-1 through a tapered portion 390.

In some embodiments, the multi-mode waveguide 316 also has a second non-coupling multi-mode portion 316-3 located opposite to the non-coupling multi-mode portion 316-2 (which is also called a first non-coupling multi-mode portion) from the coupling multi-mode portion 316-1 and having a width that is greater than the width of the coupling multi-mode portion 316-1, and the second non-coupling multi-mode portion 316-3 is connected to the coupling multi-mode portion 316-1 through a tapered portion 392.

This reduced width of the coupling multi-mode portion 316-1 and the associated reduced center-to-center distance 346 between the waveguide 310 and the multi-mode waveguide 316 improves the coupling efficiency in coupling light between the waveguide 310 and the multi-mode waveguide 316 (compared to the coupling efficiency of the coupling region 320 shown in FIG. 3A).

The coupling multi-mode portion 316-1 has a width that enables propagation of light in a plurality of optical modes (e.g., light that is not in a fundamental optical mode). In some embodiments, the tapered portion 390 and the tapered portion 392 configured for adiabatic coupling. For example, at least one of the tapered portion 390 and the tapered portion 392 may have a linear taper profile, a parabolic taper profile, an exponential taper profile, or any other suitable taper profile. In some cases, at least one of the tapered portion 390 and the tapered portion 392 may have a linear taper profile with a tapering angle less than 0.3 degrees (e.g., a 0.2 degrees).

Figure 3D:
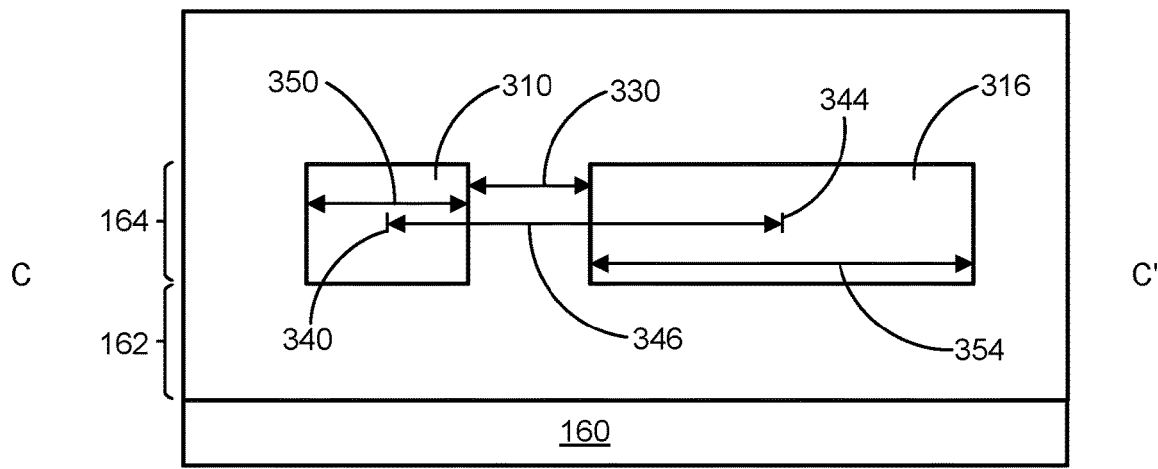
FIG. 3D is a cross-sectional view of the coupling region shown in FIG. 3C.

Also shown in FIG. 3C is line CC' representing a view from which the cross-section shown in FIG. 3D is taken. FIG. 3D illustrates that the waveguide 310 and the multi-mode waveguide 316 are located in a same layer 164 over the substrate 160. In some embodiments, another layer 162 is located between the layer 164 and the substrate 160.

Figure 3E:
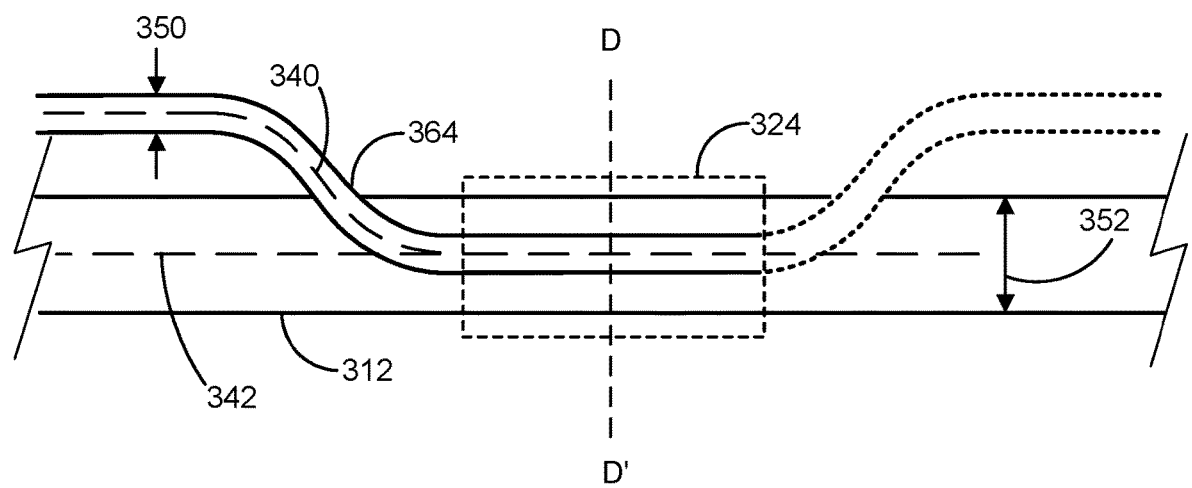
FIG. 3E is a plan view of coupling region of the optical delay device in accordance with some embodiments.

FIG. 3E shows a coupling region 324 that includes a waveguide 364 and the multi-mode waveguide 312 in a stacked configuration. The multi-mode waveguide 312 is described above with respect to FIG. 3A and its description is not repeated herein for brevity. The waveguide 364 is similar to the waveguide 310 described above with respect to FIG. 3A, except that the waveguide 364 is positioned above the multi-mode waveguide 312 instead of being place side-by-side to the multi-mode waveguide 312. By stacking the waveguide 364 and the multi-mode waveguide 312, the center-to-center distance between the waveguide 364 and the multi-mode waveguide 312 is reduced compared to the configuration shown in FIGS. 3A and 3B. The center-to-center distance between the waveguide 364 and the multi-mode waveguide 312 is illustrated in the cross-section shown in FIG. 3F, which is taken from the view represented by lines DD' in FIG. 3E.

Figure 3F:
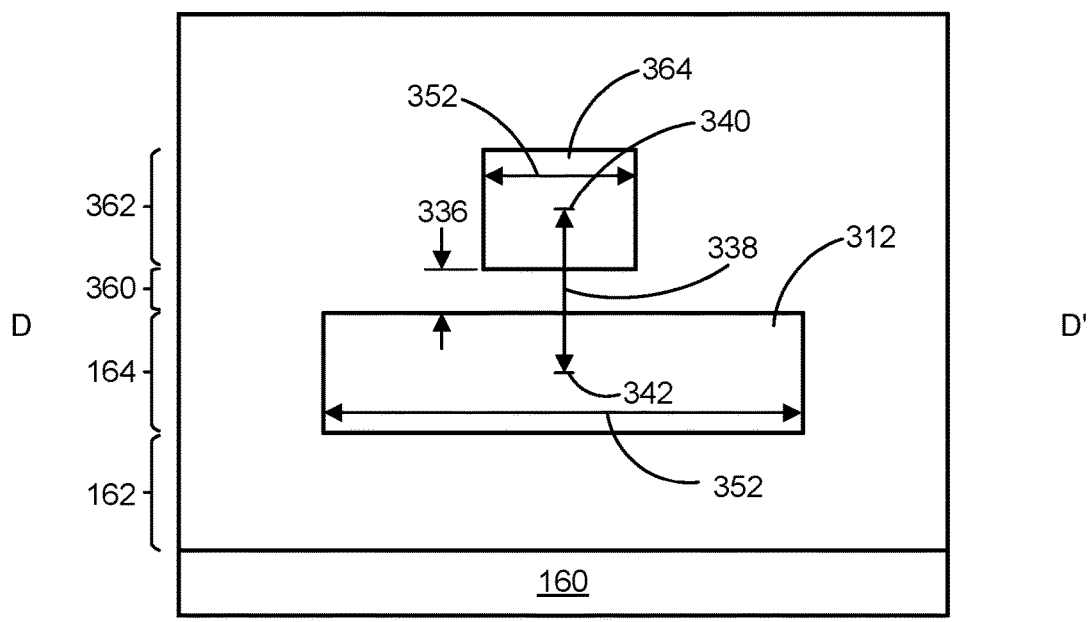
FIG. 3F is a cross-sectional view of the coupling region shown in FIG. 3E.

FIG. 3F illustrates that the multi-mode waveguide 312 is formed in the layer 164 (also called herein a first layer) and the waveguide 364 is formed in another layer 362 (also called herein a second layer) that is different from the layer 164. The layer 164 and the layer 362 are separated by a separation layer 360 (also called herein a third layer). The separation layer 360 is made of a material (e.g., the first material 161 shown in FIG. 1F) that is different from the material constituting the waveguide 364 or the multi-mode waveguide 312.

The waveguide 364 and the multi-mode waveguide 312 are separated by a separation distance 336 that corresponds to the thickness of the separation layer 360, and have a center-to-center distance 338. In some embodiments, the separation layer 360 has a thickness that is between 100 and 500 nanometers (and the corresponding center-to-center distance 338 is between 250 nm and 1500 nanometers). Thus, the center-to-center distance 338 can be less than the center-to-center distance 332 shown in FIG. 3A, and the coupling region 324 may have a coupling efficiency greater than the coupling efficiency of the coupling region 320 shown in FIG. 3A.

Figure 3G:
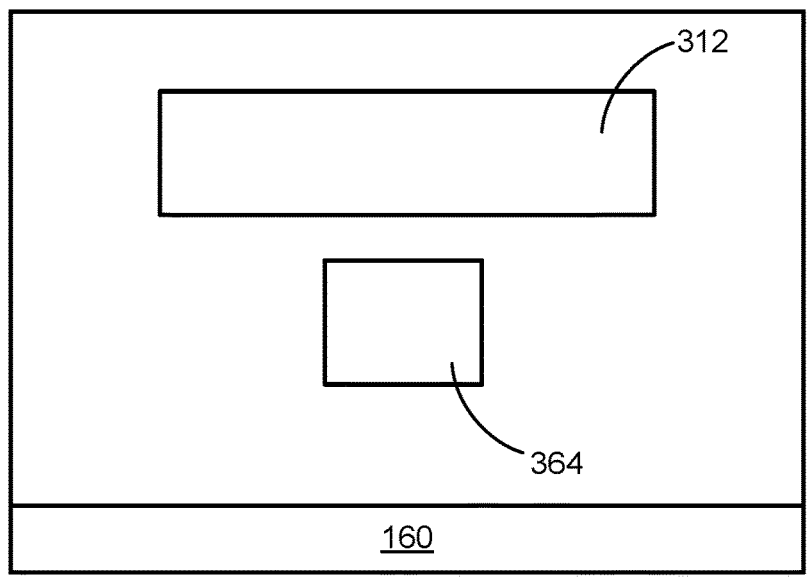
FIG. 3G is a cross-sectional view of a coupling region shown in accordance with some embodiments.

Although FIGS. 3E and 3F illustrate that the waveguide 364 is positioned above the multi-mode waveguide 312, in some configurations, the multi-mode waveguide 312 is positioned above the waveguide 364 as shown in FIG. 3G.

Figure 3H:
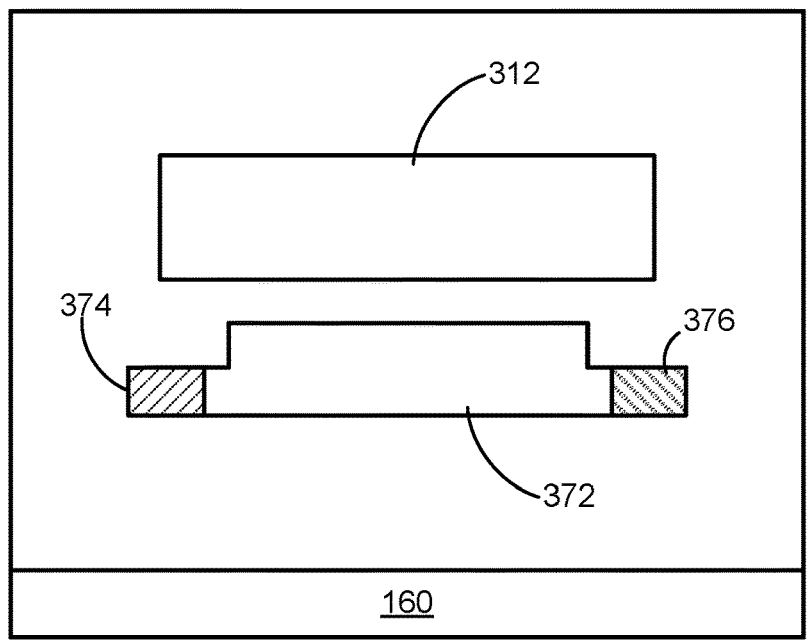
FIG. 3H is a cross-sectional view of a coupling region in accordance with some embodiments.

FIG. 3H is a cross-sectional view of a coupling region in accordance with some embodiments. The coupling region shown in FIG. 3H is similar to the cross-section shown in FIG. 3G, except that a waveguide 372 located between electrodes 374 and 376 is used instead of the waveguide 364. In some embodiments, the electrodes 374 and 376 are made of doped semiconductor materials (e.g., the electrode 374 is a p-doped region and the electrode 376 is an n-doped region). The refractive index of the material constituting the waveguide 372 is changed by providing an electric field between electrodes 374 and 376 (e.g., by applying a voltage exceeding a voltage threshold between electrodes 374 and 376). Thus, the refractive index of the material constituting the waveguide 372 can be changed to allow coupling of light from the multi-mode waveguide 312 to the waveguide 372 or prevent coupling of light from the multi-mode waveguide 312 to the waveguide 372.

Figure 4A:
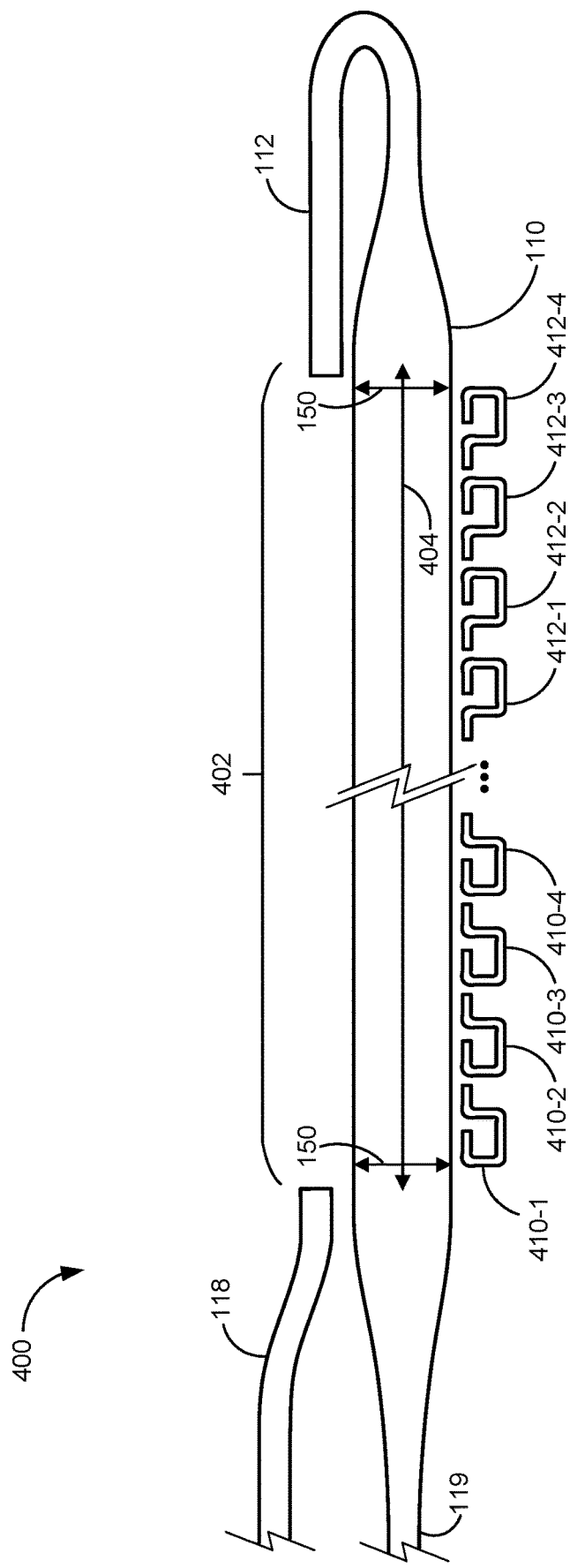
FIGS. 4A and 4B are partial plan views of optical delay devices in accordance with some embodiments.

FIG. 4A is a partial plan view of an optical delay device 400 in accordance with some embodiments.

The optical delay device 400 is similar to the optical delay device 100, and thus, the description of components described with respect to FIGS. 1A-1H is omitted herein for brevity.

The optical delay device 100 includes a multi-mode waveguide 110, where at least a region 402 of the multi-mode waveguide 110 has a uniform width along the lengthwise direction 404 of the region 402. This allows a large number of direction-reverting waveguides (e.g., waveguides 410-1 through 410-4 and waveguide 412-1 through 412-4) that are separate from the multi-mode waveguide 110 to be placed adjacent to the multi-mode waveguide 110 so that light propagating within the multi-mode waveguide 110 couples into one of the direction-reverting waveguides or light propagating within the direction-reverting waveguides couples into the multi-mode waveguide 110. For example, the optical delay device 100 includes eight or more direction-reverting waveguides in addition to the multi-mode waveguide 100 (e.g., nine, ten, twenty, or forty waveguides).

In some embodiments, light in a first mode propagates through the region 402 of the multi-mode waveguide 110. The waveguide 112 receives the light and injects the light back into the multi-mode waveguide 110 as light in a second mode. The light in the second mode propagates through at least a portion of the region 402 of the multi-mode waveguide 110 until the light is coupled into the waveguide 410-1, which injects the light back into the multi-mode waveguide 110 as light in a third mode. The light in the third mode propagates through at least a portion of the region 402 of the multi-mode waveguide 110 until the light is coupled into the waveguide guide 412-1, which injects the light back into the multi-mode waveguide 110 as light in a fourth mode. The light in the fourth mode propagates through at least a portion of the region 402 of the multi-mode waveguide 110 until the light is coupled into the waveguide 410-2, which injects the light back into the multi-mode waveguide 110 as light in a fifth mode. The light of the fifth mode propagates through at least a portion of the region 402 of the multi-mode waveguide 110 until the light is coupled into the waveguide 412-2, which injects the light back into the multi-mode waveguide 110 as light in a sixth mode. The light in the sixth mode propagates through at least a portion of the region 402 of the multi-mode waveguide 110 until the light is coupled into the waveguide 410-3, which injects the light back into the multi-mode waveguide 110 as light in a seventh mode. The light of the seventh mode propagates through at least a portion of the region 402 of the multi-mode waveguide 110 until the light is coupled to the waveguide 412-3, which injects the light back into the multi-mode waveguide 110 as light in an eighth mode. The light in the eighth mode propagates through at least a portion of the region 402 of the multi-mode waveguide 110 until the light is coupled into the waveguide 410-4, which injects the light back into the multi-mode waveguide 110 as light in a ninth mode. The light of the ninth mode propagates through at least a portion of the region 402 of the multi-mode waveguide 110 until the light is coupled into the waveguide 412-4, which injects the light back into the multi-mode waveguide 110 as light in a tenth mode. The light in the tenth mode propagates through at least a portion of the region 402 of the multi-mode waveguide 110 until the light is coupled into the waveguide 118. In some cases, the first mode, the second mode, the third mode, the fourth mode, the fifth mode, the sixth mode, the seventh mode, the eighth mode, the ninth mode, and the tenth mode are different from one another. This configuration allows the distance between each pair of direction-reverting waveguides (e.g., a distance between a pair of waveguides 410-1 and 412-1, a distance between a pair of waveguides 410-2 and 412-2, a distance between a pair of waveguides 410-3 and 412-3, a distance between a pair of waveguides 410-4 and 412-4, etc.) to be the same, which improves the performance of the optical delay device.

Figure 4B:
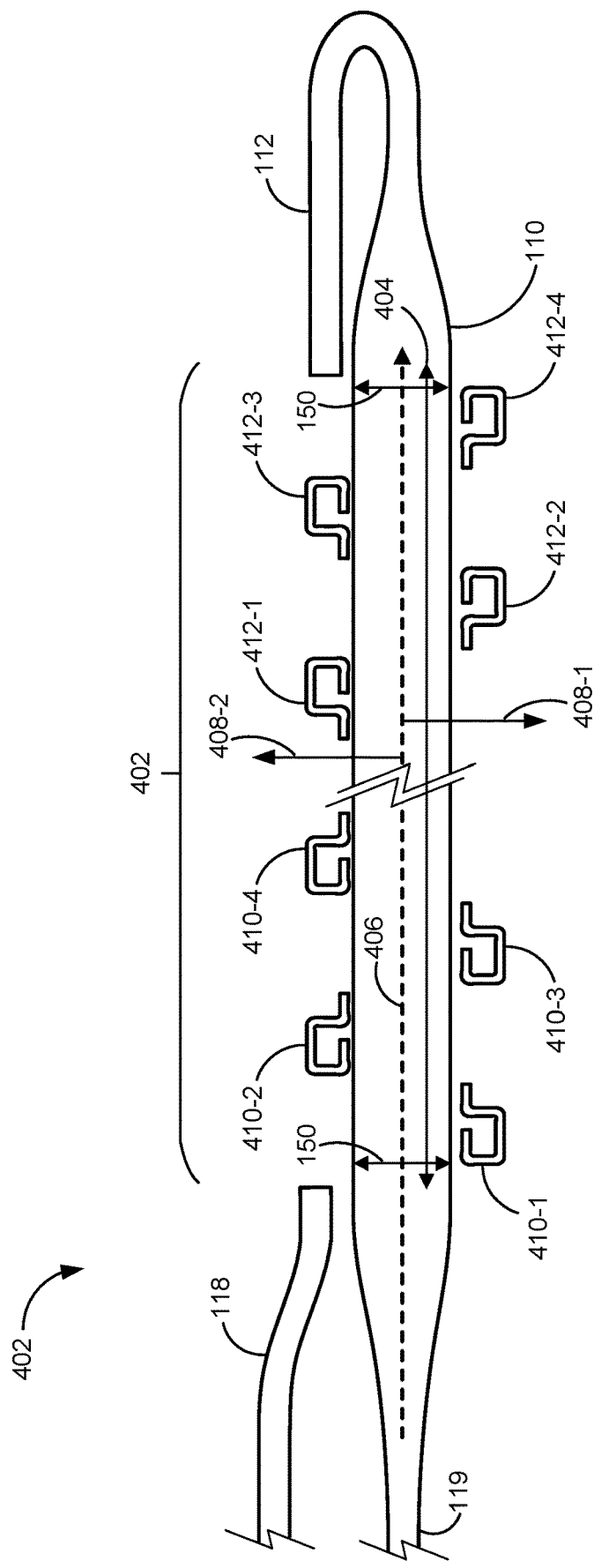

FIG. 4B is a partial plan view of an optical delay device 402 in accordance with some embodiments.

The optical delay device 402 is similar to the optical delay device 400 shown in FIG. 4A, except that a first group of direction-reverting waveguides (e.g., waveguides 410-1, 410-3, 412-2, and 412-4) are located on a first side 408-1 of the multi-mode waveguide 110 from a center line 406 of the multi-mode waveguide 110 and a second group of direction-reverting waveguides (e.g., waveguides 410-2, 410-4, 412-1, and 412-3) are located on a second side 408-2 of the multi-mode waveguide 110 from the center line 406 of the multi-mode waveguide 110 opposite to the first side 408-1 of the multi-mode waveguide 110. The center line 406 of the multi-mode waveguide 110 extends along the length-wise direction 404 of the multi-mode waveguide 110. This allows the direction-reverting waveguides to be spaced apart from each other, compared to the configuration shown in FIG. 4A, and reduces optical coupling between the direction-reverting waveguides.

Figure 5:
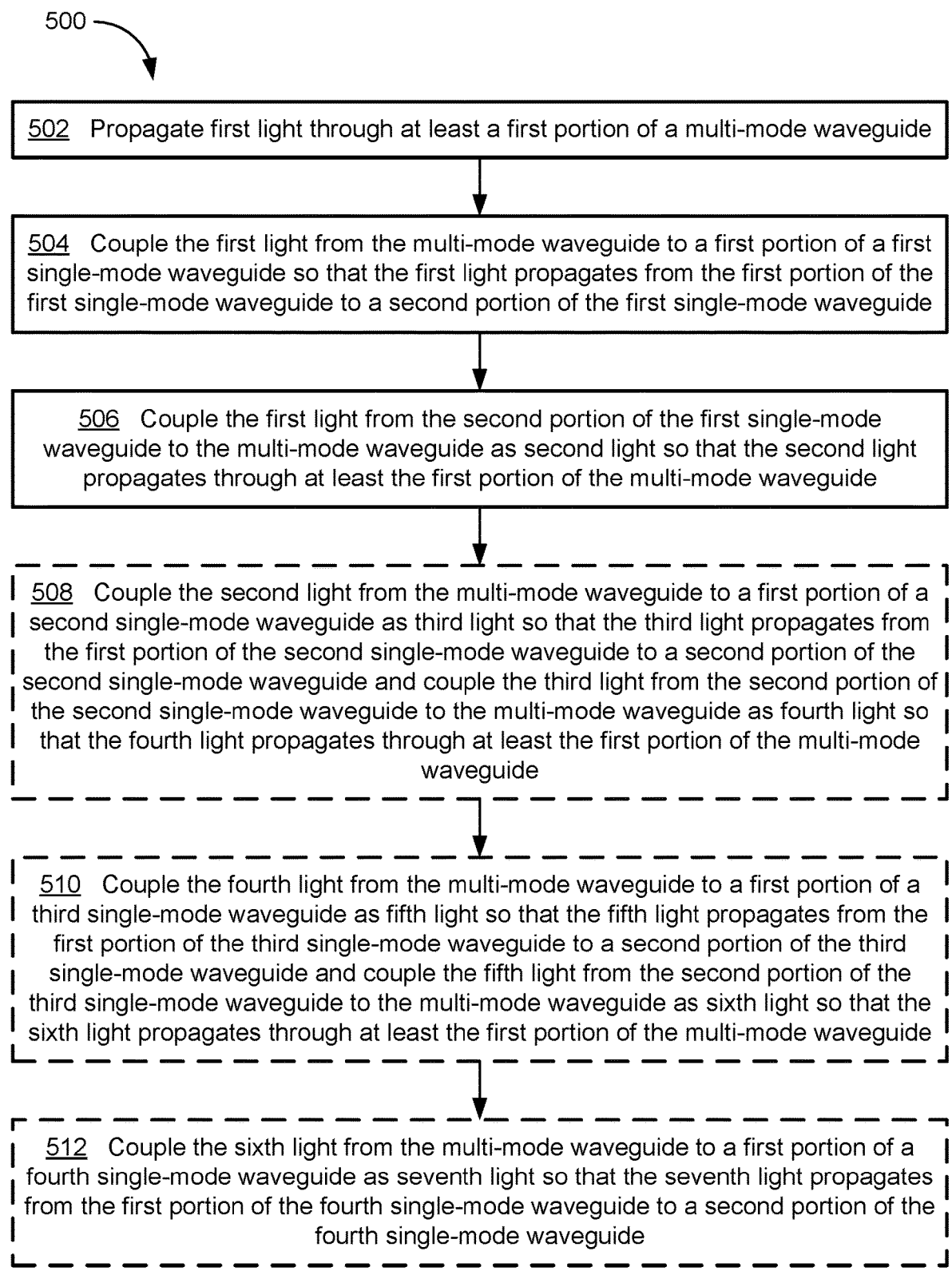
FIG. 5 is a flowchart illustrating a method of propagating light to create an optical delay in accordance with some embodiments.

FIG. 5 is a flowchart illustrating a method 500 in accordance with some embodiments.

The method 500 includes (502) propagating the first light 190-A through at least the first portion 110-1 of the multi-mode waveguide 110, as shown in FIG. 1A.

The method 500 also includes (504) coupling the first light 190-A from the multi-mode waveguide 110 to the first portion 112-1 of the first waveguide 112 so that the first light 190-A propagates from the first portion 112-1 of the first waveguide 112 to a second portion 112-2 of the first waveguide 112.

The method 500 further includes (506) coupling the first light from the second portion of the first waveguide to the multi-mode waveguide as the second light 190-B so that the second light 190-B propagates through at least the first portion 110-1 of the multi-mode waveguide 110.

In some embodiments, the method 500 includes (508) coupling the second light 190-B from the multi-mode waveguide 110 to the first portion 114-1 of the second waveguide 114 as the third light 190-C as shown in FIG. 1B so that the third light 190-C propagates from the first portion 114-1 of the second waveguide 114 to a second portion 114-2 of the second waveguide 114 and coupling the third light 190-C from the second portion 114-2 of the second waveguide 114 to the multi-mode waveguide 110 as the fourth light 190-D so that the fourth light 190-D propagates through at least the first portion 110-1 of the multi-mode waveguide 110.

In some embodiments, the method 500 also includes (510), subsequent to coupling the third light 190-C from the second portion 114-2 of the second waveguide 114 to the multi-mode waveguide 110 as the fourth light 190-D, coupling the fourth light 190-D from the multi-mode waveguide 110 to the first portion 116-1 of the third waveguide 116 as the fifth light 190-E as shown in FIG. 1B so that the fifth light 190-E propagates from the first portion 116-1 of the third waveguide 116 to the second portion 116-2 of the third waveguide 116 and coupling the fifth light 190-E from the second portion 116-2 of the third waveguide 116 to the multi-mode waveguide 110 as the sixth light 190-F as shown in FIG. 1C so that the sixth light 190-F propagates through at least the first portion 110-1 of the multi-mode waveguide 110.

In some embodiments, the method 500 further includes (512), subsequent to coupling the fifth light 190-E from the second portion 116-2 of the third waveguide 116 to the multi-mode waveguide 110 as the sixth light 190-F, coupling the sixth light 190-F from the multi-mode waveguide 110 to the first portion 118-1 of the fourth waveguide 118 as the seventh light 190-G so that the seventh light 190-G propagates from the first portion 118-1 of the fourth waveguide 118 to the second portion 118-2 of the fourth waveguide 118.

It should be noted that details of optical delay devices described with respect to FIGS. 1A-3H are applicable in an analogous manner to the method 500. For brevity, these details are not repeated here.

Figure 6:
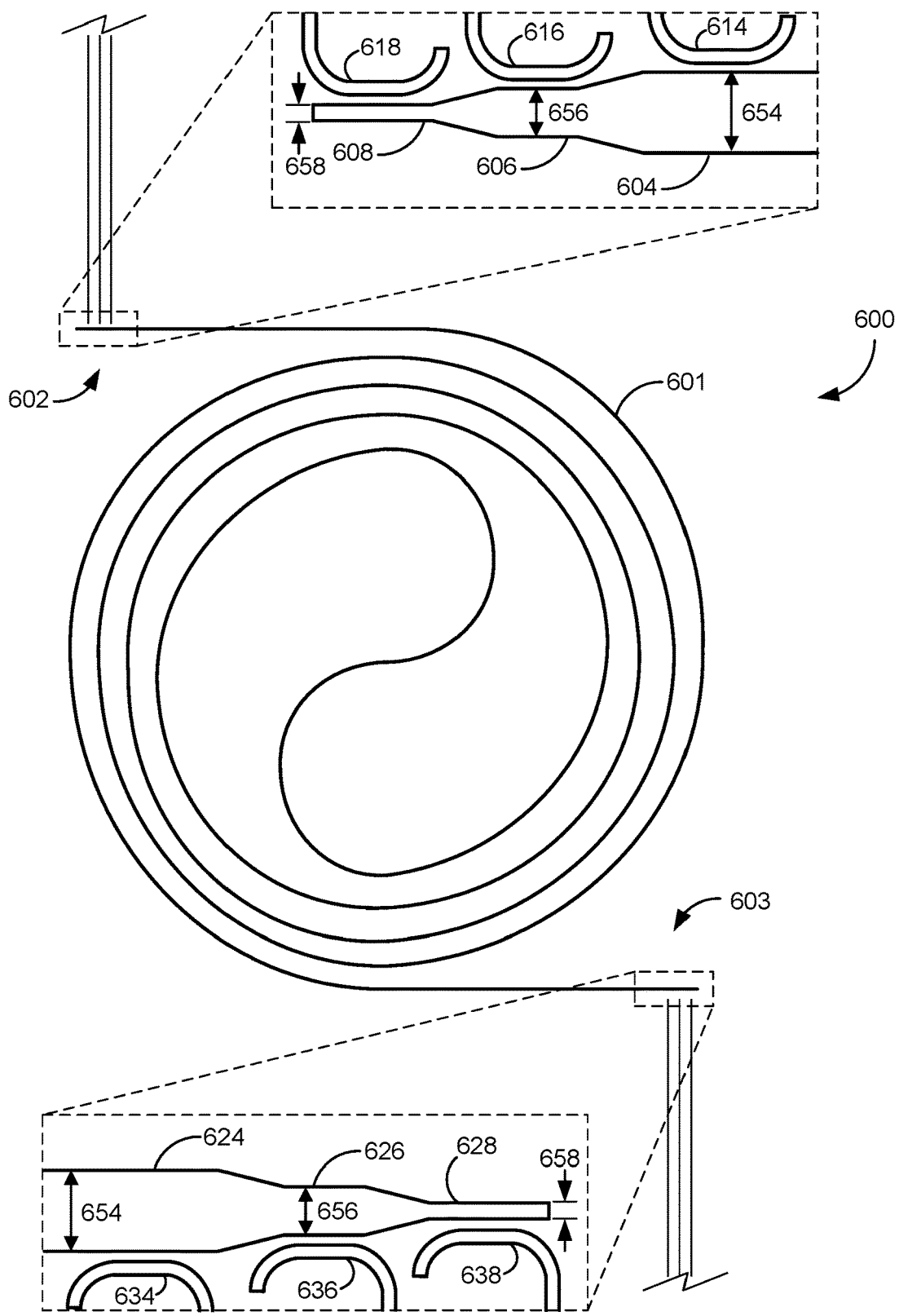
FIG. 6 illustrates a multi-channel optical delay device in accordance with some embodiments.

FIG. 6 is a schematic diagram illustrating a multi-channel optical delay device 600 in accordance with some embodiments.

The multi-channel optical delay device 600 includes a delay line 601 that includes a multi-mode waveguide. A first end 602 of the delay line 601 has a first portion 604 having a first width 654, a second portion 606 having a second width 656 different from the first width 654, and a third portion 608 having a third width 658 different from the first width 654 and the second width 656. The first portion 604 is configured for coupling light from a first input waveguide 614, the second portion 606 is configured for coupling light from a second input waveguide 616, and the third portion 608 is configured for coupling light from a third input waveguide 618.

Based at least in part on the ratio of the width of the first input waveguide 614 and the first width 654 of the first portion 604, light propagating in the first input waveguide 614 in a first optical mode is coupled to the first portion 604 as light in a second optical mode that is different from the first optical mode. For example, in a configuration in which the first input waveguide 614 has 1-micron width and the first portion 604 has 3.5-micron width, light propagating in the first input waveguide 614 in the $TE_0$ mode is coupled into the first portion 604 as light in the $TE_2$ mode. Similarly, based on the ratio of the width of the second input waveguide 616 and the second width 656 of the second portion 606, light propagating in the second input waveguide 616 in the first optical mode is coupled to the second portion 606 as light in a third optical mode that is different from the first optical mode and the second optical mode. For example, in a configuration in which the second input waveguide 616 has 1-micron width and the second portion 606 has 2.25-micron width, light propagating in the second input waveguide 616 in the $TE_0$ mode is coupled into the second portion 606 as light in the $TE_1$ mode. Furthermore, based on the ratio of the width of the third input waveguide 618 and the third width 658 of the third portion 608, light propagating in the third input waveguide 618 in the first optical mode is coupled to the third portion 608 as light in a fourth optical mode that is different from the second optical mode and the third optical mode. In some embodiments, the fourth optical mode and the first optical mode as the same (e.g., both the first optical mode and the fourth optical mode are the fundamental optical mode). For example, in a configuration in which the third input waveguide 618 has 1-micron width and the third portion 608 has 1-micron width, light propagating in the third input waveguide 618 in the $TE_0$ mode is coupled into the third portion 608 as light in the $TE_0$ mode. In some embodiments, the third input waveguide 618 is directly coupled to the third portion 608 instead of using a directional coupler (e.g., in a configuration in which the third input waveguide 618 and the third portion 608 have the same width, the third input waveguide 618 is directly connected to the third portion 608, and in a configuration in which the third input waveguide 618 and the third portion 608 have different widths, the third input waveguide 618 is connected to the third portion 608 through an adiabatic coupler).

This configuration allows input lights from the input waveguides 614, 616, and 618 to couple into the delay line 601 in different optical modes so that the input lights can propagate concurrently through the same delay line 601. A conventional optical delay device with separate delay lines for separate input waveguides may require a larger area than the multi-channel optical delay device 600 (e.g., three delay lines for three input waveguides may occupy an area larger than the area occupied by the delay line 601). In addition, in the conventional optical delay device, the optical path length provided for each input waveguide may not be the same, due to the variation in the manufacturing process and environmental variations (e.g., temperature variation). In the multi-channel optical delay device 600, because the input lights (converted into different optical modes) propagate through the same delay line 601, the optical delay is substantially uniform across the optical modes and the multi-channel optical delay device 600 can provide a more uniform optical delay to the input lights than conventional optical delay devices.

In some embodiments, a second end 603 of the delay line 601 has a first portion 624 having the first width 654, a second portion 626 having the second width 656, and a third portion 628 having the third width 658. The first portion 624 is configured for coupling light to a first output waveguide 634, the second portion 606 is configured for coupling light to a second output waveguide 636, and the third portion 608 is configured for coupling light to a third output waveguide 638. In some embodiments, all of the input waveguides 614, 616, and 618 and the output waveguides 634, 636, and 638 have a same width (e.g., 1 micron). In some embodiments, at least one of the input waveguides 614, 616, and 618 has a width that is different from the width of another one of the input waveguides 614, 616, and 618. In some embodiments, at least one of the output waveguides 634, 636, and 638 has a width that is different from the width of another one of the output waveguides 634, 636, and 638.

Although the first portion 624 of the second end 603 has the same width as the first portion 604 of the first end 602 in FIG. 6, in some embodiments, the first portion 624 of the second end 603 may have a width that is different from the width of the first portion 604 of the first end 602. Similarly, in some embodiments, the second portion 626 of the second end 603 has a width that is different from the width of the second portion 606 of the first end 602, and in some embodiments, the third portion 628 of the second end 603 has a width that is different from the width of the third portion 608 of the first end 602.

Although the delay line 601 is illustrated as a spiral delay line in FIG. 6, the delay line 601 may be arranged in a different shape (e.g., a linear delay line).

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, although FIGS. 1A-1D illustrate the optical delay device that is capable of propagating light through the multi-mode waveguide up to four times, a person having ordinary skill in the art would understand that additional waveguides can be added to increase the number of times that the provided light passes through the multi-mode waveguide. The embodiments were chosen in order to best explain the principles underlying the claims and their practical applications, to thereby enable others skilled in the art to best use the embodiments with various modifications as are suited to the particular uses contemplated.

What is claimed is:

1. A method comprising:
coupling a first waveguide, comprising a first input waveguide, and a second waveguide, comprising a second input waveguide, in a first plurality of waveguides to a multimode waveguide delay device comprising a spiral delay line, the first waveguide and the second waveguide being coupled to a first end of the multimode waveguide delay device, the multimode waveguide delay device comprising a second end that is opposite of the first end,
the first waveguide being coupled to a first optical mode in the multimode waveguide delay device for coupling light from the first waveguide into the multimode waveguide delay device, and
the second waveguide being coupled to a second optical mode in the multimode waveguide delay device for coupling light from the second waveguide into the multimode waveguide delay device,
the second optical mode being different than the first optical mode,
coupling, at the second end of the multimode waveguide delay device, the first optical mode and the second optical mode from the multimode waveguide delay device to a second plurality of waveguides,
the first optical mode being coupled to a third waveguide, comprising a first output waveguide, of the second plurality of waveguides, and
the second optical mode being coupled to a fourth waveguide, comprising a second output waveguide, of the second plurality of waveguides, wherein the multimode waveguide delay device is configured to provide a uniform optical delay between the first end of the multimode waveguide delay device and the second end of the multimode waveguide delay device.

2. The method of claim 1, wherein:
the first end comprises a first portion that tapers to a second portion, the first portion having a first width and the second portion having a second width that is larger than the first width, and
the second end comprising a third portion that tapers to a fourth portion, the third portion having the second width, the fourth portion having the first width.

3. The method of claim 2, wherein:
the first waveguide is coupled to the first portion of the multimode waveguide delay device, and
the second waveguide is coupled to the second portion of the multimode waveguide delay device.

4. The method of claim 3, wherein:
the third waveguide is coupled to the third portion of the multimode waveguide delay device, and
the fourth waveguide is coupled to the fourth portion of the multimode waveguide delay device.

5. The method of claim 2, wherein:
the first end comprises a fifth portion, wherein the second portion tapers to the fifth portion, the fifth portion having a third width that is larger than the second width, and
the second end comprising a sixth portion, wherein the fourth portion tapers to the sixth portion, the sixth portion having the third width.

6. The method of claim 2, wherein the first, second, third, and fourth waveguides have a fifth width.

7. The method of claim 6, wherein:
a ratio of the first width to the fifth width is selected so as to couple light traveling in a respective optical mode in the first waveguide to the first optical mode in the multimode waveguide delay device; and
a ratio of the second width to the fifth width is selected so as to couple light traveling in the respective optical mode in the second waveguide to the second optical mode in the multimode waveguide delay device.

8. The method of claim 7, wherein the respective optical mode is a $TE_0$ mode.

9. The method of claim 8, wherein the first optical mode is a $TE_1$ mode and the second optical mode is a $TE_2$ mode.

10. An optical device comprising:
a first plurality of waveguides including a first waveguide, comprising a first input waveguide, and a second waveguide, comprising a second input waveguide;
a multimode waveguide delay device comprising a spiral delay line having a first end and a second end opposite the first end, wherein:

the first waveguide and the second waveguide are coupled to the first end of the multimode waveguide delay device, the first waveguide is coupled to a first optical mode in the multimode waveguide delay device for coupling light from the first waveguide into the multimode waveguide delay device, the second waveguide is coupled to a second optical mode in the multimode waveguide delay device for coupling light from the second waveguide into the multimode waveguide delay device, and the second optical mode is different than the first optical mode; and a second plurality of waveguides including a third waveguide, comprising a first output waveguide, and a fourth waveguide, comprising a second output waveguide, wherein:

the third waveguide and the fourth waveguide are coupled to the second end of the multimode waveguide delay device, the third waveguide is coupled to the first optical mode in the multimode waveguide delay device, and the fourth waveguide is coupled to the second optical mode in the multimode waveguide delay device, wherein the multimode waveguide delay device is configured to provide a uniform optical delay between the first end of the multimode waveguide delay device and the second end of the multimode waveguide delay device.

11. The optical device of claim 10, wherein:

the first end comprises a first portion that tapers to a second portion, the first portion having a first width and the second portion having a second width that is larger than the first width, and the second end comprising a third portion that tapers to a fourth portion, the third portion having the second width, the fourth portion having the first width.

12. The optical device of claim 11, wherein:

the first waveguide is coupled to the first portion of the multimode waveguide delay device, and the second waveguide is coupled to the second portion of the multimode waveguide delay device.

13. The optical device of claim 12, wherein:

the third waveguide is coupled to the third portion of the multimode waveguide delay device, and the fourth waveguide is coupled to the fourth portion of the multimode waveguide delay device.

14. The optical device of claim 11, wherein:

the first end comprises a fifth portion, wherein the second portion tapers to the fifth portion, the fifth portion having a third width that is larger than the second width, and the second end comprising a sixth portion, wherein the fourth portion tapers to the sixth portion, the sixth portion having the third width.

15. The optical device of claim 11, wherein the first, second, third, and fourth waveguides have a fifth width.

16. The optical device of claim 15, wherein:

a ratio of the first width to the fifth width is selected so as to couple light traveling in a respective optical mode in the first waveguide to the first optical mode in the multimode waveguide delay device; and a ratio of the second width to the fifth width is selected so as to couple light traveling in the respective optical mode in the second waveguide to the second optical mode in the multimode waveguide delay device.

17. The optical device of claim 16, wherein the respective optical mode is a $TE_0$ mode.

18. The optical device of claim 17, wherein the first optical mode is a $TE_1$ mode and the second optical mode is a $TE_2$ mode.

* * * * *